United States Patent
Kumar et al.

(10) Patent No.: US 12,456,015 B1
(45) Date of Patent: Oct. 28, 2025

(54) NATURAL LANGUAGE QUESTION GENERATION

(71) Applicant: Amazon Technologies, Inc., Seattle, WA (US)

(72) Inventors: Anoop Kumar, Fountain Valley, CA (US); Yi Fung, Quincy, MA (US); Premkumar Natarajan, Rolling Hills Estates, CA (US); Aram Galstyan, Los Angeles, CA (US); Heng Ji, Champaign, IL (US)

(73) Assignee: Amazon Technologies, Inc., Seattle, WA (US)

( * ) Notice: Subject to any disclaimer, the term of this patent is extended or adjusted under 35 U.S.C. 154(b) by 228 days.

(21) Appl. No.: 18/193,693

(22) Filed: Mar. 31, 2023

(51) Int. Cl.
G06F 40/30 (2020.01)
G06F 16/3329 (2025.01)
G06F 40/40 (2020.01)

(52) U.S. Cl.
CPC .......... *G06F 40/30* (2020.01); *G06F 16/3329* (2019.01); *G06F 40/40* (2020.01)

(58) Field of Classification Search
CPC ............ G06F 3/04895; G06F 16/2365; G06F 16/3329; G06F 40/103; G06F 40/205; G06F 40/289; G06F 40/295; G06F 40/30; G06F 16/243; G06F 16/3325; G06F 16/34; G06F 21/6245; G06N 3/006; G06N 3/084; G06N 5/02; G06N 20/00; G06N 3/043; G06N 3/0455; G06N 3/08; G06N 3/096; G06Q 10/10; G09B 7/00; G10L 15/183

See application file for complete search history.

(56) References Cited

U.S. PATENT DOCUMENTS

| | | | | |
|---|---|---|---|---|
| 7,693,705 B1* | 4/2010 | Jamieson | .............. | G06F 40/103 704/10 |
| 10,170,014 B2* | 1/2019 | Beason | .................... | G09B 7/00 |
| 10,387,576 B2* | 8/2019 | Beller | ................... | G06F 40/284 |
| 11,687,734 B2* | 6/2023 | Harper | .................. | G06F 40/295 704/9 |
| 11,734,510 B2* | 8/2023 | Hu | .......................... | G06F 40/30 704/9 |
| 11,741,306 B2* | 8/2023 | Galley | ..................... | G06F 40/56 704/9 |

(Continued)

OTHER PUBLICATIONS

Michael J. Bommarito II, et al., "LexNLP: Natural language processing and information extraction for legal and regulatory texts," arXiv preprint arXiv:1806.03688v1, 2018, 7 pages.

(Continued)

*Primary Examiner* — Gerald Gauthier
(74) *Attorney, Agent, or Firm* — Pierce Atwood LLP

(57) ABSTRACT

Techniques for generating a natural language prompt to further a goal of a dialog, are described. During a dialog, the system receives one or more user inputs including a user question, a user response to the question, and a request to generate a further question following the response. The system determines ASR output data corresponding to the user inputs, and determines dialog history data of the dialog. Using the ASR output data and the dialog history data, the system determines a category and an explanation of relevance corresponding to the category. Using the ASR output data, the dialog history, the category, and the explanation, the system determines the further question to be output to the user.

20 Claims, 16 Drawing Sheets

(56) References Cited

U.S. PATENT DOCUMENTS

| | | | | |
|---|---|---|---|---|
| 11,741,316 | B2* | 8/2023 | Galitsky | G06F 40/44 |
| | | | | 704/9 |
| 11,783,131 | B2* | 10/2023 | Yuan | G06N 20/00 |
| | | | | 704/9 |
| 12,141,535 | B2* | 11/2024 | Galitsky | G06N 3/08 |
| 12,182,518 | B2* | 12/2024 | Galitsky | G06F 16/3329 |
| 2002/0169595 | A1* | 11/2002 | Agichtein | G06F 40/205 |
| | | | | 704/9 |
| 2018/0075366 | A1* | 3/2018 | Dole | G06F 40/289 |
| 2018/0144047 | A1* | 5/2018 | Beller | G06F 16/34 |
| 2018/0260472 | A1* | 9/2018 | Kelsey | G06F 40/56 |
| 2018/0293302 | A1* | 10/2018 | Ko | G06F 40/295 |
| 2018/0357324 | A1* | 12/2018 | Chakraborty | G06F 3/04895 |
| 2019/0163745 | A1* | 5/2019 | Beller | G06F 40/51 |
| 2019/0197415 | A1* | 6/2019 | Bulut | G06N 20/00 |
| 2020/0089768 | A1* | 3/2020 | Kim | G06N 5/02 |
| 2020/0125658 | A1* | 4/2020 | Gupta | G06F 16/2365 |
| 2021/0056150 | A1* | 2/2021 | Karandish | G06F 16/3329 |
| 2021/0209139 | A1* | 7/2021 | Wu | G06N 3/006 |
| 2021/0286833 | A1* | 9/2021 | Verstraete | G06Q 10/10 |
| 2021/0406467 | A1* | 12/2021 | Li | G06F 16/3329 |
| 2022/0067281 | A1* | 3/2022 | Hu | G06F 40/30 |
| 2022/0067486 | A1* | 3/2022 | Klein | G06N 3/084 |
| 2022/0245838 | A1* | 8/2022 | Wu | G06F 40/289 |
| 2022/0300718 | A1* | 9/2022 | Chen | G06N 3/043 |
| 2022/0300756 | A1* | 9/2022 | Sekar | G06N 20/00 |
| 2022/0391849 | A1* | 12/2022 | O'Connor | G06F 40/56 |
| 2023/0061773 | A1* | 3/2023 | Patil | G06F 40/30 |
| 2023/0061906 | A1* | 3/2023 | Gaur | G06F 16/243 |
| 2023/0081891 | A1* | 3/2023 | Kulkarni | G06N 3/0455 |
| | | | | 706/50 |
| 2023/0169362 | A1* | 6/2023 | Beucher | G06N 3/096 |
| | | | | 706/12 |
| 2023/0222164 | A1* | 7/2023 | Silverstein | G06F 16/3329 |
| | | | | 707/723 |
| 2023/0281393 | A1* | 9/2023 | Shroff | G06F 40/211 |
| | | | | 704/9 |
| 2024/0045990 | A1* | 2/2024 | Boyer | G06F 40/20 |
| 2024/0248918 | A1* | 7/2024 | Bhagavan | G06F 16/3329 |
| 2024/0282298 | A1* | 8/2024 | Koneru | G10L 15/183 |
| 2024/0311403 | A1* | 9/2024 | Bursztyn | G06F 16/3325 |
| 2024/0320445 | A1* | 9/2024 | Mallick | G06F 40/30 |
| 2024/0419908 | A1* | 12/2024 | Alkhalifa | G06F 40/211 |
| 2025/0078484 | A1* | 3/2025 | Nguyen | G06V 10/80 |

OTHER PUBLICATIONS

Kevin Ros, et al., "Generation of student questions for inquiry-based learning," Proceedings of the 15th International Conference on Natural Language Generation, 2022, pp. 186-195.

Brown, et al., "Language Models Are Few-Shot Learners", Advances in Neural Information Processing Systems, vol. 33, pp. 877-1901, 2020.

Chalkidis, et al., "MultiEURLEX—a multi-lingual and multi-label legal document classification dataset for zero-shot cross-lingual transfer", Proceedings of the 2021 Conference on Empirical Methods in Natural Language Processing, Association for Computational Linguistics, pp. 6974-6996, 2021.

Chalkidis, et al., "Legal-Bert: The muppets straight out of law school", Findings of the Association for Computational Linguistics: EMNLP 2020, Online, pp. 2898-2904, 2020.

Chalkidis, et al., "LexGLUE: A benchmark dataset for legal language understanding in English", Proceedings for the 60th Annual Meeting of the Association for Computational Linguistics (vol. 1: Long Papers), pp. 4310-4330, 2022.

Choi, et al., "QuAC: Question answering in context", Proceedings of the 2018 Conference on Empirical Methods in Natural Language Processing, pp. 2174-2184, 2018.

Du, et al., "Identifying where to focus in reading comprehension for neural question generation", Proceedings of the 2017 Conference on Empirical Methods in Natural Language Processing, pp. 2067-2073, 2017.

Du, et al., "Learning to ask: Neural question generation for reading comprehension", Proceedings of the 55th Annual Meeting of the Association for Computational Linguistics (vol. 1: Long Papers), pp. 1342-1352, 2017.

Duan, et al. "Question generation for question answering", Proceedings of the 2017 Conference of Empirical Methods in Natural Language Processing, pp. 866-874, 2017.

Forbes, et al., "Social chemistry 101: Learning to reason about social and moral norms", Proceedings of the 2020 Conference on Empirical Methods in Natural Language Processing (EMNLP), Online, pp. 653-670, 2020.

Fung, et al., "Normsage: Multi-lingual multi-cultural norm discovery from conversations on-the-fly", 2022, arXiv preprint arXiv:2210.08604.

Lee, et al., "Does GPT-3 generate empathetic dialogues? A novel in-context example selection method and automatic evaluation metric for empathetic dialogue generation", Proceedings of the 29th International Conference on Computational Linguistics, pp. 669-683, 2022.

Lewis, et al., "BART: Denoising sequence-to-sequence pre-training for natural language generation, translation, and comprehension", Proceedings of the 58th Annual Meeting of the Association for Computational Linguistics, pp. 7871-7880, Online, 2020.

Limsopatham, "Effectively leveraging BERT for legal document classification", Proceedings of the Natural Legal Language Processing Workshop 2021, pp. 210-216, 2021.

Majumder, et al., "Interview: Large-scale modeling of media dialog with discourse patterns and knowledge grounding", Proceedings of the 2020 Conference on Empirical Methods in Natural Language Processing (EMNLP), pp. 8129-8141, 2020.

Majumder, et al., "Ask what's missing and what's useful: Improving clarification questions generation using global knowledge", Proceedings of the 2021 Conference of the North American Chapter of the Association for Computational Linguistics: Human Language Technologies, pp. 4300-4312, Online, 2021.

Polsley, et al., "CaseSummarizer: A system for automated summarization of legal texts", Proceedings of COLING 2016, the 26th International Conference on Computational Linguistics: System Demonstrations, pp. 258-262, 2016.

Qi, et al., "Stay hungry, stay focused: Generating informative and specific questions in information-seeking conversations", Findings of the Association for Computational Linguistics: EMNLP 2020, pp. 25-40, Online, 2020.

Rajpurkar, et al., "SQaAD: 100,000+ questions for machine comprehension of text", Proceedings of the 2016 Conference on Empirical Methods in Natural Language Processing, pp. 2383-2392, 2016.

Rao, et al., "Learning to ask good questions: Ranking clarification questions using neural expected value of perfect Information", Proceedings of the 56th Annual Meeting of the Association for Computational Linguistics (Volue 1: Long Papers), pp. 2737-2746, 2018.

Ravichander, et al., "Question answering for privacy policies: Combining computational and legal perspectives", Proceedings of the 2019 Conference on Empirical Methods in Natural Language Processing and the 9th International Joint Conference on Natural Language Processing (EMNLP-IJCNLP), pp. 4947-4958, 2019.

Roller, et al., "Recipes for building an open-domain chatbot", Proceedings of the 16th Conference of the European Chapter of the Association for Computational Linguistics: Main Volume, pp. 300-325, 2021.

Sellam, et al., "BLEURT: Learning robust metrics for text generation", Proceedings of the 58th Annual Meeting of the Association for Computational Linguistics, pp. 7881-7892, Online, 2020.

Williams, et al., "A broad-coverage challenge corpus for sentence understanding through inference", Proceedings of the 2018 Conference of the North American Chapter of the Association for Computational Linguistics: Human Language Technologies, vol. 1 (Long Papers), pp. 1112-1122, 2018.

Wu, et al., "De-biased court's view generation with causality", Proceedings of the 2020 Conference on Empirical Methods in Natural Language Processing (EMNLP), pp. 763-780, Online, 2020.

(56) References Cited

OTHER PUBLICATIONS

Zhong, et al., "How does NLP benefit legal system: A summary of legal artificial intelligence", Proceedings of the 58th Annual Meeting of the Association for Computational Linguistics, pp. 5218-5230, Online, 2020.

* cited by examiner

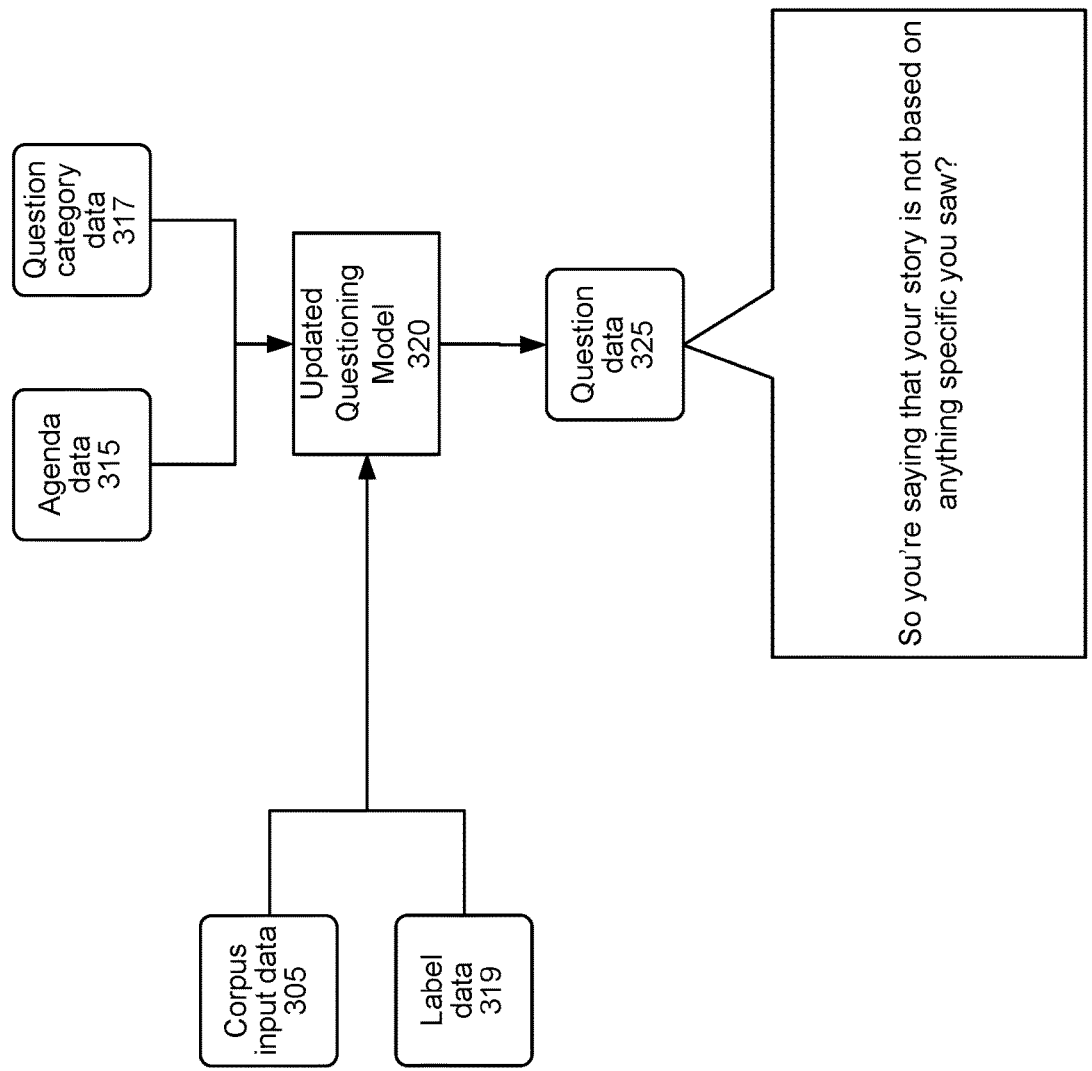

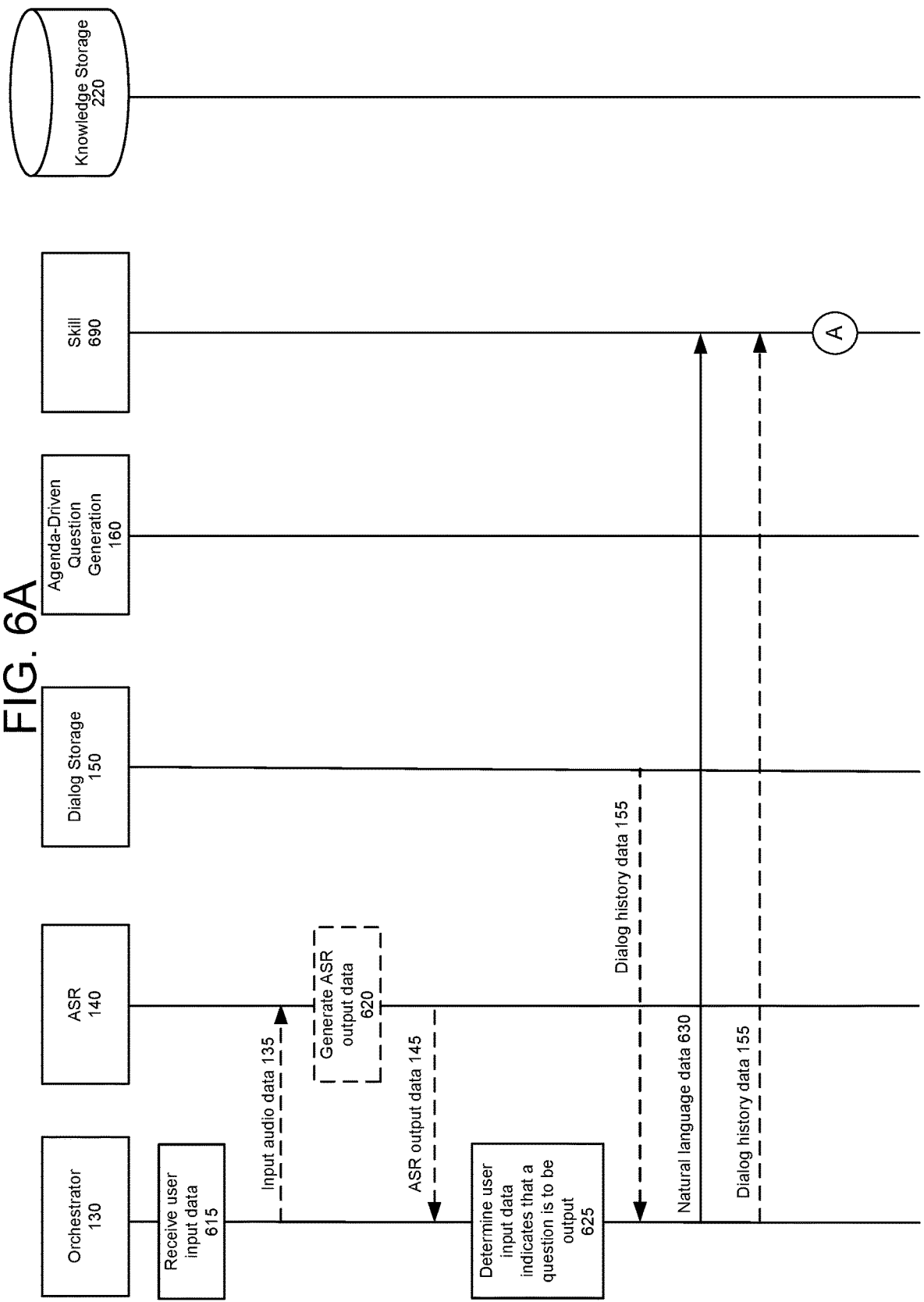

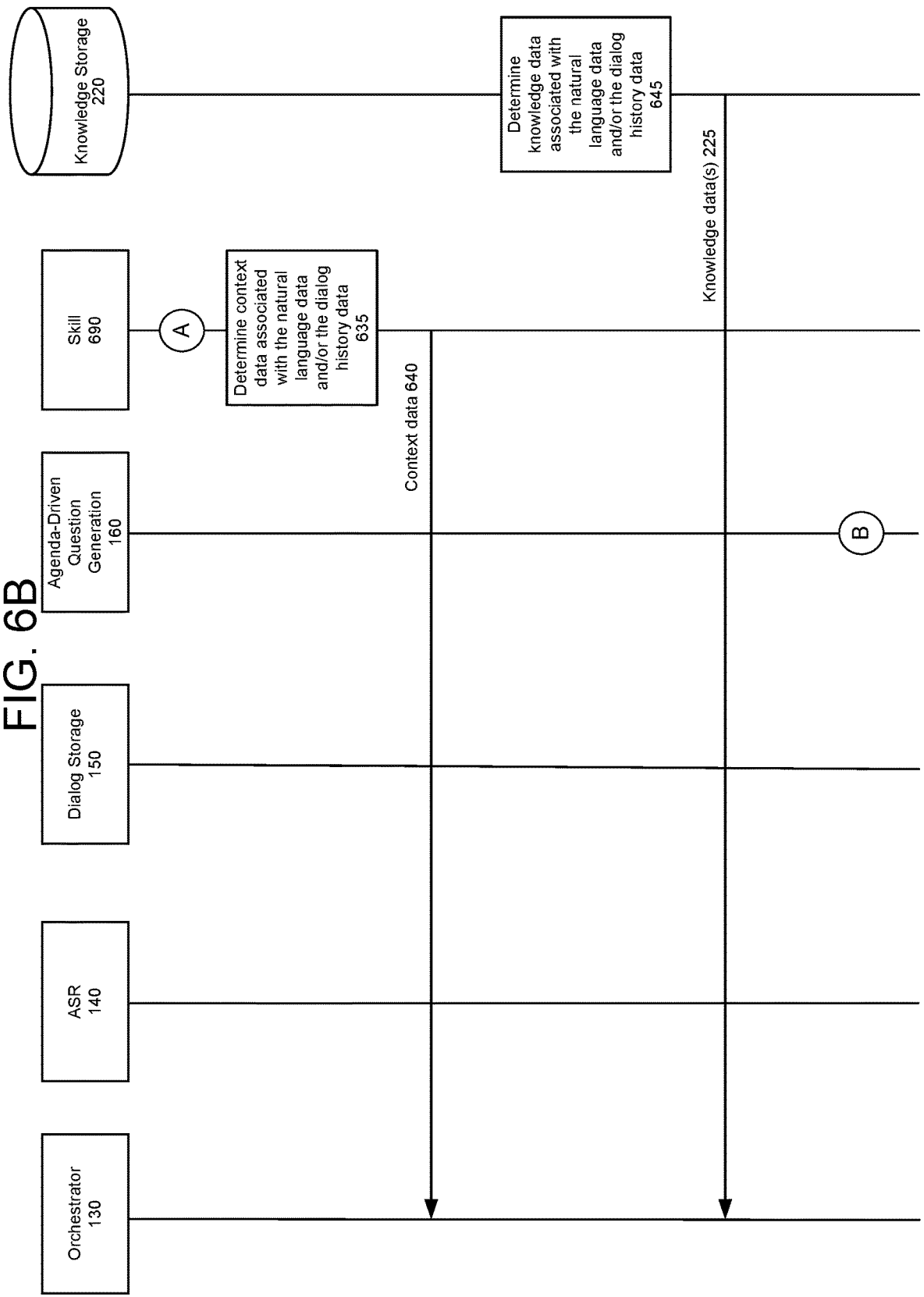

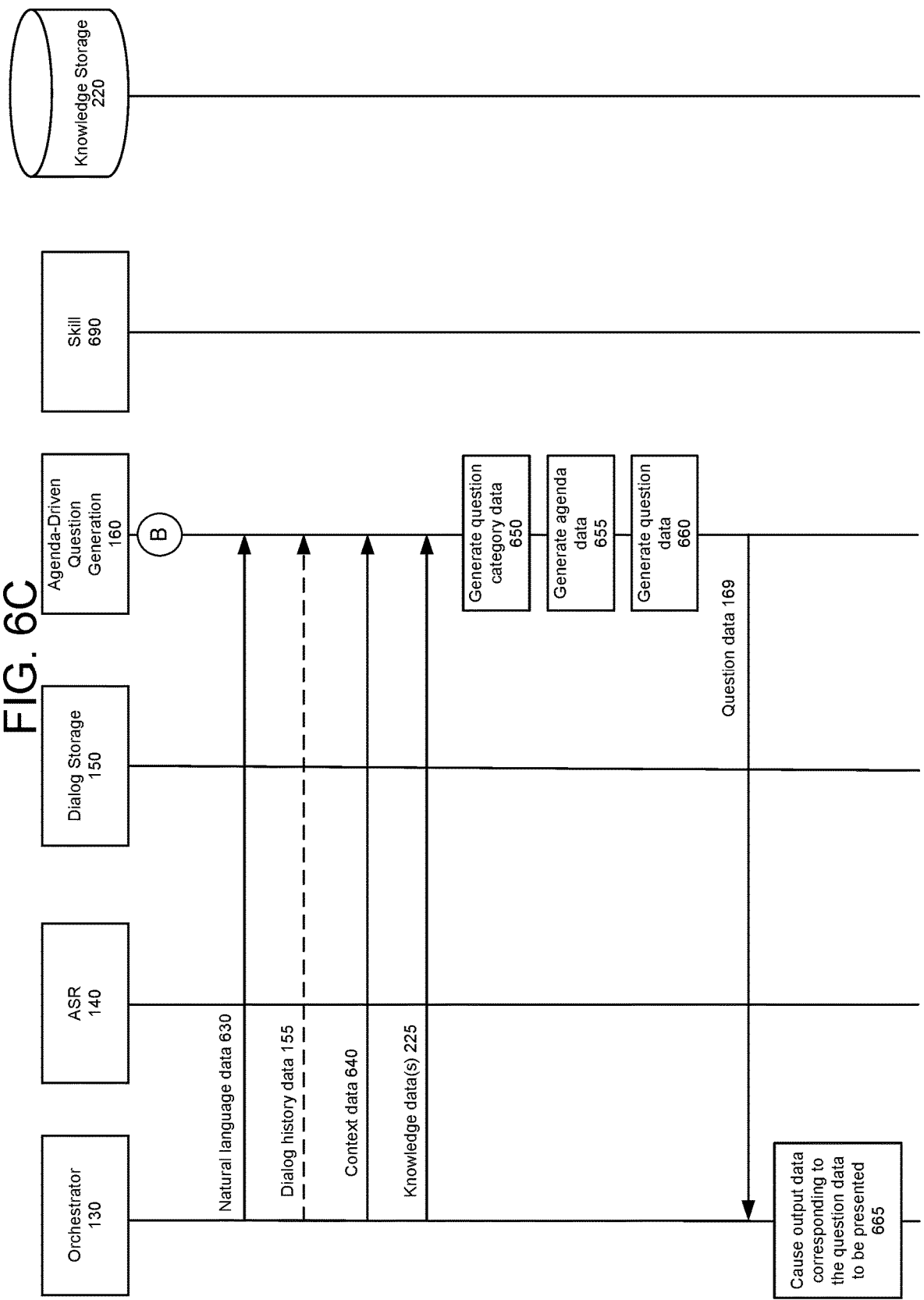

NATURAL LANGUAGE QUESTION GENERATION

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A-3B are conceptual diagrams illustrating example processing performed by the system to train a model to generate a natural language question, according to embodiments of the present disclosure.

FIGS. 6A-6C are a signal flow diagram illustrating example operations of the system to generate a natural language question, according to embodiments of the present disclosure.

DETAILED DESCRIPTION

Figure 1:
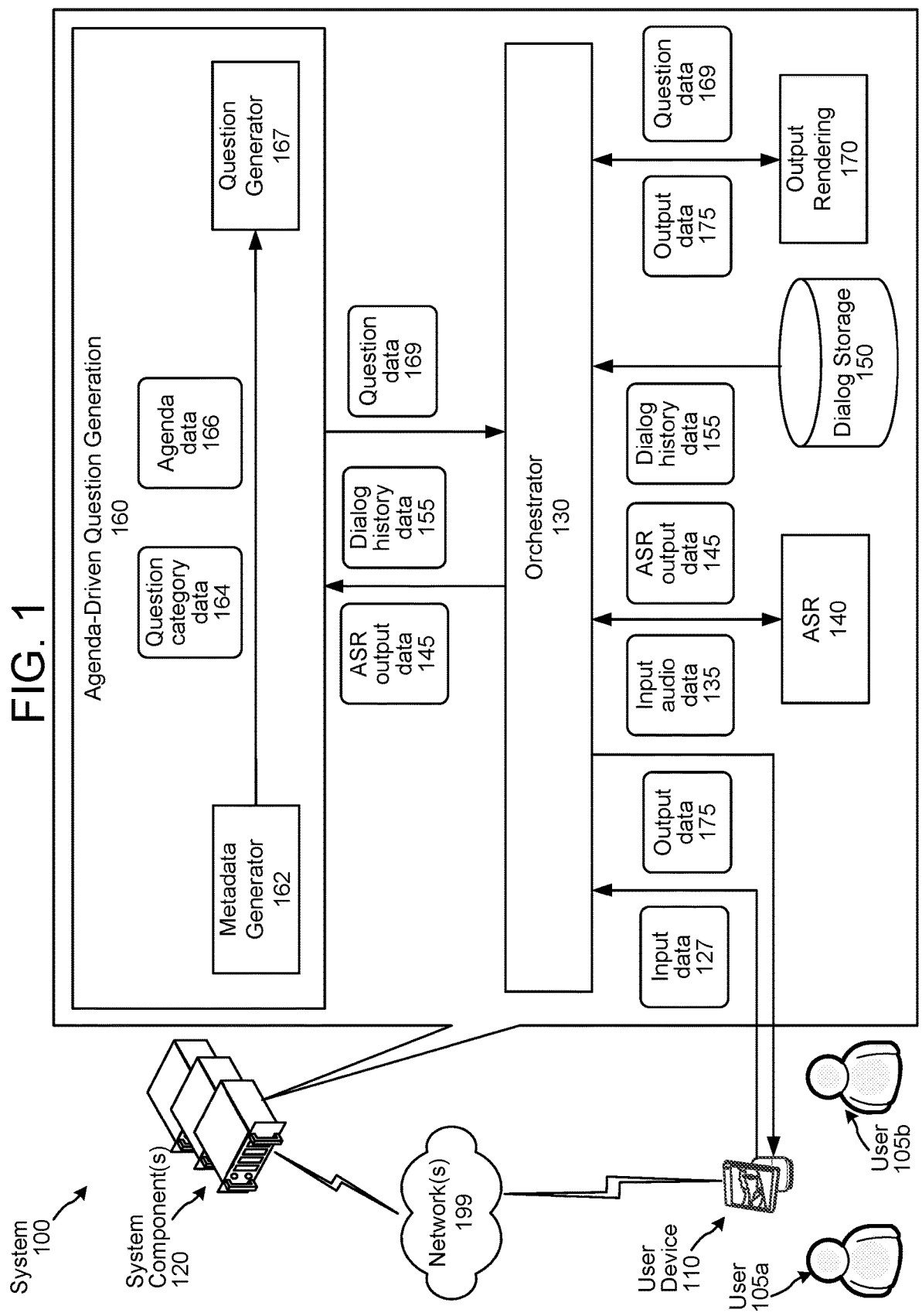
FIG. 1 is a conceptual diagram illustrating a system for generating a natural language question associated with a goal of a dialog, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

A system may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

In some instances, the system may be configured to generate and output a natural language prompt to further a goal of a dialog (e.g., learning/testing a subject, resolving a dispute/disagreement, engaging in a legal examination, practicing for an interview, engaging in an inquisitive discussion about a subject, etc.). For example, in response to the natural language user input "I am learning about [entity], can you quiz me," the system may determine to further output an audio (and/or visual) question corresponding to "What is the definition of [entity]?" For further example, in response to the natural language user input "[User] and I are having a dispute about [subject], can you help us resolve it," the system may determine to further output an audio (and/or visual) question corresponding to "Is it fair to say that you have a personal attachment to [subject]?" As another example, in response to the natural language user input "Yes, [user] is a childhood friend of mine," responsive to a previous question "do you know [user]" of the dialog, the system may determine to further output an audio (and/or visual) question corresponding to "Wouldn't you say, therefore, that it's possible you have a bias towards [user]?" Many such examples are possible.

In general, the system may be configured to engage in a question-and-answer format in an interaction between one or more users and/or the system, such that one or more users can provide the system with details about a subject (e.g., an event), and, optionally, a goal associated with the subject that is to be furthered during a dialog, and the system may generate and output questions related to the subject, where the questions further the goal associated with the subject.

As used herein, a "dialog" may refer to data transmissions (such as relating to multiple user inputs and system outputs) between the system and one or more users (e.g., through one or more user devices) that all relate to a single "conversation" between the system and the one or more users. Additionally, in some instances, the dialog may further data transmissions may relate to a single "conversation" between one or more users. In some instances, the "conversation" may include a question-and-answer dialog, such as a court examination and/or a questioning between two or more users and/or the system. Thus, the data transmissions of a dialog may be associated with a same dialog identifier, which may be used by components of the system to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system to engage in a question-and-answer format and may provide information about a subject in a spoken utterance and the system may respond by displaying images associated with the subject and ask the user to identify the correct image. The user may then speak a response (e.g., "image 1" or "that one") or may gesture a response (e.g., point to an item on the screen or give a thumbs-up) or may touch the screen on the desired image to be selected. Non-speech inputs (e.g., gestures, screen touches, etc.) may be part of the dialog and the data associated therewith may be associated with the dialog identifier of the dialog.

The system may be configured to generate the questions associated with the subject, which further the goal of the dialog, using a specific corpus of information (e.g., a corpus of information associated with the subject and/or associated with the goal, such as witness examinations, professional interviews, dispute resolutions, etc.). The corpus of information may include various portions of natural language information associated with the subject and/or the goal, which may correspond to various formats (e.g., a format associated with a legal proceeding (e.g., direct and/or cross-examination of witnesses, a deposition, etc.), a format associated with a professional question-and-answer interaction (e.g., an interview, a panel discussion, etc.), a format associated with an informal, yet inquisitive, interaction (e.g., an oral examination, a gameshow, flash cards, etc.), etc.) As such, the system may be configured, using the corpus of information, to generate one or more questions associated with the corpus of information, where the one or more questions correspond to a format or template similar to that of the corpus of information. For example, for an interaction between one or more users and/or the system, which is associated with a subject of legal examinations and a goal of questioning a witness, the system may be configured using a corpus of information associated with legal examinations and/or questioning of a witness.

Configuring the system using a corpus of information may comprise training one or more components to generate a category associated with a next predicted question associated with the corpus of information and a natural language explanation of relevance of the category and/or predicted next question. After training the one or more components to generate the natural language explanation and the category, the system may use the corpus of information to train one or more components how to generate the predicted next question associated with the corpus of information, given the corpus of information and the natural language explanation and category.

As such, the present disclosure provides techniques for generating and outputting a question that furthers a goal associated with a subject of a dialog. The system may receive one or more user inputs and process the user input(s) to determine ASR output(s) including a transcript(s) of the user input(s). For example, the system may receive a first user input representing a question corresponding to a dialog, a second user input representing a response to the question, and a third user input corresponding to a request to generate a second question following the response. The system may process the user inputs to determine the ASR outputs including the transcripts of the user inputs. In some embodiments, the system may further determine a dialog history associated with the user inputs/dialog, which includes one or more previous user inputs and/or one or more previous system-generated responses of the current dialog including one or more users and/or the system. For example, the dialog history may correspond to one or more questions and one or more responses to the questions. In some embodiments, the system may receive the user input corresponding to the request to generate the second question, and may determine the dialog history, which may include the question and the response to the question.

The system may process the ASR output(s), the dialog history, and additional information associated with the ASR output and the dialog history (e.g., retrieved from a knowledge base) to determine a question category and an agenda corresponding to a next question (e.g., a predicted question) in the dialog. The question category may represent a category to which the next question may correspond. The agenda may represent a natural language explanation for the question category and/or for asking the next question. The system may use the question category and the agenda to determine a natural language question corresponding to the next question, where the natural language question is associated with the ASR output and the dialog history data. In instances where there is no dialog history for the dialog, the system may use the ASR output to directly determine a natural language question corresponding to an initial question associated with the ASR output. The system may cause output of the natural language question as an audio and/or visual output.

In some instances, prior to receiving the user input, the system may receive an indication that the system is to generate and output one or more questions that further a goal associated with a subject of the dialog (e.g., a court examination). For example, the system may receive a user input requesting that the system generate and output such a question. The system may further receive a natural language input associated with the subject and/or goal. For example, the system may receive a user input corresponding to information related to the subject and/or the goal (e.g., a court transcript, a description of relevant facts of a court proceeding, etc.). The system may process the information to generate one or more questions associated with the subject and/or goal. In such instances, the dialog history may include the one or more questions generated by the system.

Teachings of the present disclosure provide, among other things, an improved user experience by presenting one or more users with a question associated with an interaction between one or more users and/or the system, where the question furthers a goal of the interaction between the one or more users and/or the system.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located. FIG. 1 illustrates a system 100 for generating and outputting a question to a user to further a goal of a dialog. The system 100 may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components. With reference to FIG. 1, the system component(s) 120 may include an orchestrator component 130, an ASR component 140, a dialog storage component 150, a agenda-driven question generation component 160, and an output rendering component 170. However, the present disclosure is not intended to be limited to such a configuration. In some embodiments, the user device 110 may include or otherwise be configured to perform the herein disclosed processing of one or more of the orchestrator component 130, the ASR component 140, the dialog storage component 150, the agenda-driven question generation component 160, and the output rendering component 170. In some embodiments, the content generation component may include a metadata generator component 162, and a question generator component 167.

As illustrated in FIG. 1, the user device 110 may receive a user input, and send input data 127 corresponding thereto to the system component(s) 120.

The user input may correspond to a response to a question associated with a subject (e.g., a legal case, a dispute/argument, a job position, a discussion topic, a topic of study, etc.). For example, the user input may correspond to "I grew up with [user] in Boston," in response to the question "how do you know [user]?" For further example, the user input may correspond to "No, I was the only one in the room when the vase broke," in response to the question "was there anyone else in the room when it happened?" For further example, the user input may correspond to "I have over a decade of experience in the field as a full stack engineer," in response to the question "what are your qualifications for the position?" In some embodiments, the user input may correspond to a response by the user 105 to a question output by the user device 110. Alternatively, the user input may correspond to a response by a first user 105a to a question asked by a second user 105b. In some embodiments, the question asked by a second user 105b may be output to the second user 105b by the user device 110.

In some embodiments, the user input may correspond to a command/request for the user device to generate and output a question to further a particular goal. For example, the user input may be "Enter questioning mode," "Can you help settle this dispute," "Can you weigh in on this situation," or the like. Such a user input may also include information related to a subject (e.g., a legal case, a dispute/argument, a job position, a discussion topic, a topic of study, etc.) and/or a description of the particular goal that is to be furthered by generation and output of questions by the user device 110/system component(s) 120. For example, the user input may be "I have a legal examination coming up, can you help me come up with some questions for the examination of the witnesses?" or "I have a legal examination coming up, here are some details about the case, can you help me come up with some questions for the examination of the witnesses?" For further example, the user input may be "I am studying for a test about [subject], can you ask me questions?" or "I am studying for a test about [subject], in particular [entity name], can you ask me questions?" For further example, the user input may be "I have an interview for [Job Position], can you help me prepare?" or "I have an interview for [Job Position], here are some details about the position, can you help me prepare?" As another example, the user input may be "Can you help me settle this dispute? Here are some details." Another example may be that the user input is "Ask me questions about [Subject]" or "Ask me questions based on the following information: [Subject]."

In some embodiments, such a user input may be received after a dialog has begun, in which case the system 100 may process as described herein below with respect to FIGS. 1-2. In other embodiments, such a user input may be received as a start of a dialog, in which case the system 100 may process as described herein below after the discussion with respect to FIG. 1.

As stated above, in general, the system 100 is configured such that the user 105 can provide the system 100 with details about a subject, and, optionally, an agenda/goal associated with the subject that is to be furthered during a dialog, and the system 100 may generate and output questions related to the subject, where the questions may further the agenda/goal associated with the subject.

As discussed above, in some instances, the system 100 may receive multiple user inputs, including a user input represent a question of a dialog, a response to the question, and a request to generate a further question of the dialog.

The input data 127 may include various types of data. For example, the input data 127 may include input audio data 135 when the user input is a spoken natural language input. In the situation where the input data 127 includes input audio data 135, the input audio data 135 may correspond to spoken natural language received by one or more microphones of or associated with the user device 110. For further example, the input data 127 may include input text (or tokenized) data when the user input is a typed natural language user input. In some embodiments, the input data 127 may include other types of data, such as data representing selection of a button displayed on a graphical user interface (GUI), image data of a gesture user input, etc.

The system component(s) 120 may receive the input data 127 at the orchestrator component 130. The orchestrator component 130 may be configured to facilitate processing performed by various components of the system component(s) 120. For example, the orchestrator component 130 may be configured to facilitate processing to understand a user input, as well as to perform an action responsive to the user input.

In the situation where the input data 127 is or includes input audio data 135, the orchestrator component may send the input audio data 135 to the ASR component 140. In the situation where the input data 127 is or includes other types of data (e.g., data representing selection of a button displayed on a GUI, image data of a gesture user input, etc.), the system component(s) 120 may send the input data 127 to one or more components configured to process the received data to generate a text (or tokenized) representation of the data capable of being processed by the agenda-driven question generation component 160. For example, if the input data 127 represents selection of a GUI-displayed button corresponding to "Yes," in response to the output question "wouldn't you agree that this benefitted you," then a gesture detection component, of the system component(s) 120, may process the input data 127 to generate a text (or tokenized) representation of "I agree that this benefitted me" or "Yes." For further example, if the user input data is or includes image data of a user gesture corresponding to the user nodding its head in response to the output question "wouldn't you agree that this benefitted you," then a gesture detection component, of the system component(s) 120, may process the image data to generate a text (or tokenized) representation of "I agree that this benefitted me" or "Yes."

In the situation where the input data 127 is or includes input audio data 135 and the orchestrator component 130 sends the input audio data 135 to the ASR component 140, the ASR component 140 processes the input audio data 135 and generates ASR output data 145 including a text or tokenized transcript of the spoken natural language input of input audio data 135. Processing of the ASR component 140 is described in further detail herein below in connection with FIG. 7. The ASR component 140 may send the ASR output data 145 to the orchestrator component 130, and the orchestrator component may, in turn, send the ASR output data 145 to the agenda-driven question generation component 160.

In some embodiments, the orchestrator component 130 may determine to send the ASR output data 145 to the agenda-driven question generation component 160 based on determining an indicator associated with a device identifier of the user device 110 represents that the user device 110 is operating in a question generation mode. For example, the user device 110 may be configured to determine input data corresponding to a user input, including a wakeword indicating that the user 105 intends to provide a user input to the user device 110, and send the input data to the system component(s) 120 to perform speech processing and determine a response to the user input. In some embodiments, the user device 110 may perform the speech processing and may determine the response. In some embodiments, in response to determining, that the user input requests that a question be output and/or that the user device 110 enter the question generation mode, the user device 110 and/or the system component(s) may store an indicator representing the user device 110 is to operate in the question generation mode in association with a device identifier for the user device 110. In the question generation mode, the user device 110 may be configured to determine input data corresponding to a user input, and send the input data to the system component(s) 120 to generate a question associated with the user input and/or a dialog between the user 105 and the system 100. In some embodiments, while in the question generation mode, the user device 110 may determine the input data regardless of whether the user input includes a wakeword. In some embodiments, the user device 110 may be capable of generating the question.

In some embodiments, the orchestrator component 130 may send the ASR output data 145 to the agenda-driven question generation component 160 in response to determining that a portion of the input data 127 corresponds to a request to generate a question. For example, in some embodiments, the input data 127 may include a first portion corresponding to the request to output a question, and a second portion corresponding to information about a subject (e.g., a legal case, a dispute/argument, a job position, a discussion topic, a topic of study, etc.). The orchestrator component 130 may send the ASR output data 145 corresponding to the input data 127 to a NLU component (e.g., the NLU component 760) to generate NLU output data including at least an intent corresponding to the input data 127. In response to determining the intent corresponding to the first portion of the input data 127 represents that the user 105 requests a question(s) associated with the second portion of the input data 127 be output, the orchestrator component 130 may send the ASR output data 145 to the agenda-driven question generation component 160.

In response to receiving the input data 127, the orchestrator component 130 may query the dialog storage component 150 for dialog history data 155. The dialog storage component 150 may store dialog history data for one or more dialogs, where the dialog history data for a single dialog may include data representing one or more turn(s) of the dialog. For example, the orchestrator component 130 may query the dialog storage component 150 using a user identifier of the user 105 and/or a device identifier of the user device 110 and/or a dialog identifier associated with the input data 127, which may be determined by another component of the system component(s) 120. The dialog history data 155 may include one or more natural language representations of previous user inputs and/or system-generated responses of a dialog. The orchestrator component 130 may send the dialog history data 155 to the agenda-driven question generation component 160. The orchestrator component 130 may send the dialog history data 155 to the agenda-driven question generation component 160 in response to making one or more of the determinations discussed herein above with respect to the ASR output data 145.

In situations where the user input data is or includes data other than input audio data, and a component(s) of the system component(s) 120 processes to generate text or tokenized data representing the user input data, the orchestrator component 130 may send this text or tokenized data to the agenda-driven question generation component 160. In situations where the user input data is or includes input text data or a typed natural language user input, the orchestrator component 130 may send the input text data to the content generation component. The orchestrator may send the text or tokenized data to the agenda-driven question generation component 160 in response to making one or more of the determinations discussed herein above with respect to the ASR output data 145.

The agenda-driven question generation component 160 processes the ASR output data 145 and the dialog history data 155 to generate question data 169. For example, the metadata generator component 162 may process the ASR output data 145 and the dialog history data 155 to generate question category data 164 and agenda data 166 associated with a next question (e.g., the question data 169) to be generated by the agenda-driven question generation component 160 in the dialog (e.g., a predicted question). The question category data 164 may be a natural language representation of a category to which the next question (e.g., the question data 169) will correspond. The agenda data 166 may represent a natural language explanation of relevance of the question category data 164 and/or the next question (e.g., the question data 169) with respect to the ASR output data 145 and the dialog history data 155. The processing of the metadata generator component 162 is described in further detail herein below with respect to FIG. 2. The question generator component 167 may process the ASR output data 145, the dialog history data 155, the question category data 164, and the agenda data 166 to generate the question data 169. The processing of the question generator component 167 is described in further detail herein below with respect to FIG. 2.

The question data 169 may correspond to a natural language question associated with the ASR output data 145 and the dialog history data 155, which is configured to further the goal of the dialog. For example, in a situation where the ASR output data 145 and/or dialog history data 155 are associated with a subject of generating questions for a witness in a legal examination, the question data 169 may correspond to "how do you know [user]?" For further example, in a situation where the ASR output data 145 and/or dialog history data 155 are associated with a subject of preparing for an interview, the question data 169 may correspond to "What are your qualifications for this position?" As another example, in a situation where the ASR output data 145 and/or dialog history data 155 are associated with a subject of learning the geography of the United States, the question data 169 may correspond to "What is the capital of Oklahoma?" For further example, in a situation where the ASR output data 145 and/or dialog history data 155 are associated with a subject of determining which guest broke a vase, the question data 169 may correspond to "Where were you when the vase broke?" Processing performed by the agenda-driven question generation component 160 to generate the question data 169 is described in detail below with respect to FIG. 2.

Figure 2:
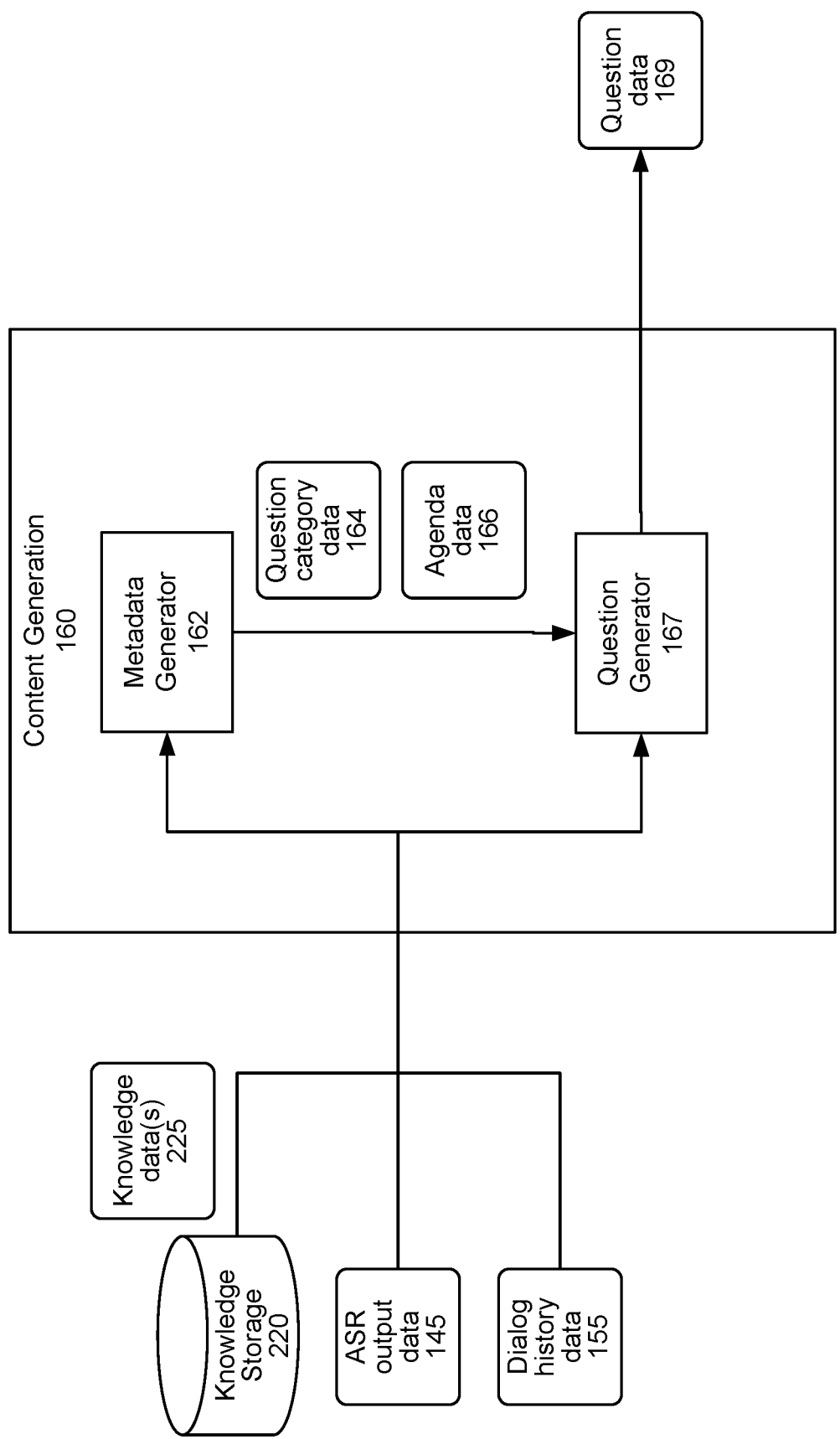
FIG. 2 is a conceptual diagram illustrating example processing performed by a content generation component to generate a natural language question, according to embodiments of the present disclosure.

FIG. 2 illustrates processing performed by the agenda-driven question generation component 160 to generate the question data 169. As shown in FIG. 2, the dialog history data 155 and the ASR output data 145 are received at the metadata generator component 162 and the question generator component 167 of the agenda-driven question generation component 160.

In some embodiments, the system 100 may further include a knowledge storage 220. The knowledge storage 220 may include one or more portions of knowledge data (e.g., corresponding to factual information). In some embodiments, the one or more portions of knowledge data may correspond to a particular subject (e.g., geography, bar trivia, the law, employment, etc.) In some embodiments, the knowledge data may be retrieved from an external source(s) (e.g., an encyclopedia, website, etc.) and stored in the knowledge storage 220, for example, in response to the knowledge data being used by the system 100 for processing with respect to a user input. In some embodiments, the knowledge storage 220 may include a knowledge graph representing associations between portions of knowledge data and example user inputs/system-generated responses (e.g., dialog history data) associated with the knowledge data. In some embodiments, the knowledge data may be stored in association with one or more entities included in and/or associated with the knowledge data.

In some embodiments, the system 100 may be configured to query the knowledge storage 220 for knowledge data(s) 225 using the ASR output data 145 and/or the dialog history data 155. For example, the system 100 may process the ASR output data 145 and/or the dialog history data 155 to determine one or more entities included in the ASR output data 145 and/or the dialog history data 155 (e.g., using named entity recognition (NER), which is described in detail herein below with respect to FIG. 7). The system 100 may query the knowledge storage 220 for the knowledge data(s) 225 using the one or more entities. The system 100 may then send the knowledge data(s) 225 to the agenda-driven question generation component 160, where the knowledge data(s) 225 may be received at the metadata generator component 162 and the question generator component 167. In some embodiments, the system 100 may use the knowledge data(s) 225 to augment the ASR output data 145 and/or the dialog history data 155. For example, the ASR output data 145 and/or the dialog history data 155 may be augmented such that the one or more entities include indications (e.g., tags) that the one or more entities are associated with the one or more of the knowledge data(s) 225. In some embodiment, the agenda-driven question generation component 160 may be configured to determine the one or more entities, query the knowledge storage 220 for the knowledge data(s) 225, and/or augment the ASR output data 145 and/or the dialog history data 155.

As described above, the metadata generator component 162 processes the ASR output data 145, the dialog history data 155, and the knowledge data(s) 225 to generate question category data 164 and agenda data 166 associated with a next question (e.g., the question data 169) to be generated by the agenda-driven question generation component 160 in the dialog (e.g., an predicted question).

As described above, the question category data 164 may be a natural language representation of a category to which the next question (e.g., the question data 169) will correspond. For example, the category may be "who," "what," "where," "when," "why." For further example, the category may be associated with a goal of the question, for example, "leading question" or "yes/no question," "point out potential inconsistency" "probe for potential bias" "repeat/rephrase question for clarity" "encouraging counsel," "inquisitive opposing-counsel," "probe for further information," "test user knowledge," "logical conclusion," etc.

As described above, the agenda data 166 may represent a natural language explanation of relevance of the question category data 164 and/or the next question (e.g., the question data 169) with respect to the ASR output data 145 and the dialog history data 155. In other words, the agenda data 166 may represent a strategic reasoning for generation of the next question (e.g., the question data 169) explaining how the next question furthers the goal associated with the ASR output data 145 and the dialog history data 155. For example, for a dialog associated with questioning of a witness in a legal proceeding, the agenda-driven question generation component 160 may determine that the next question should inquire about any potential biases the witness may have. As such, the agenda data 166 for the next question (e.g., the question data 169) may correspond to "attempting to show that the witness has a biased Opinion of the client, due to their having a falling out days before the alleged incident." As another example, for a dialog associated with resolving a dispute of who broke the family vase, the agenda-driven question generation component 160 may determine that the next question should determine the likelihood that a particular family member, who was present in the room when the vase broke, broke the vase. As such, the agenda data 166 for the next question (e.g., the question data 169) may correspond to "the question is attempting to determine whether [User] was the only person in the room when the vase broke, and therefore, is most likely to have caused the vase to break." For further example, for a dialog associated with testing/learning the geography of the United States, the agenda-driven question generation component 160 may determine that the next question should inquire about the geography of the west coast of the United States, based on dialog history data 155 indicating that the user 105 has sufficient knowledge of the East Coast of the United States. As such, the agenda data 166 for the next question (e.g., the question data 169) may correspond to "the question is attempting to test the knowledge of the geography of the West Coast of the United States, as the knowledge of the geography of the East Coast appears to be sufficient."

The metadata generator component 162 may send the question category data 164 and the agenda data 166 to the question generator component 167.

The question generator component 167 processes the ASR output data 145, the dialog history data 155, the knowledge data(s) 225, the question category data 164, and the agenda data 166, and generates the question data 169 associated with the ASR output data 145 and the dialog history data 155. In some embodiments, the question data 169 may include one or more natural language questions associated with the ASR output data 145 and the dialog history data 155 (e.g., an n-best list). The question generator component 167 may send the question data 169 to the orchestrator component 130. In some instances, the question generator component 167 may further send the question category data 164 and/or the agenda data 166 to the orchestrator component 130.

The content generation component may implement a trained machine learning (ML) model. The ML model may be configured to perform the processing of the metadata generator component 162 and the question generator component 167 to generate the next question in a dialog (e.g., the question data 169). For example, the ML model may be configured to take as input the ASR output data 145, the dialog history data 155, and the knowledge data(s) 225 and generate the question data 169. The ML model may be configured to generate the question category data 164 and the agenda data 166 using the ASR output data 145, the dialog history data 155, and the knowledge data(s) 225, and then generate the question data 169 using the ASR output data 145, the dialog history data 155, the knowledge data(s) 225, the question category data 164, and the agenda data 166. In some embodiments, the ML model may be a Transformer model (e.g., a Bidirectional Auto-Regressive Transformer (BART) model as known in the art). Further details associated with the training of the ML model are discussed herein below with respect to FIGS. 3A-3B.

Figure 3A:
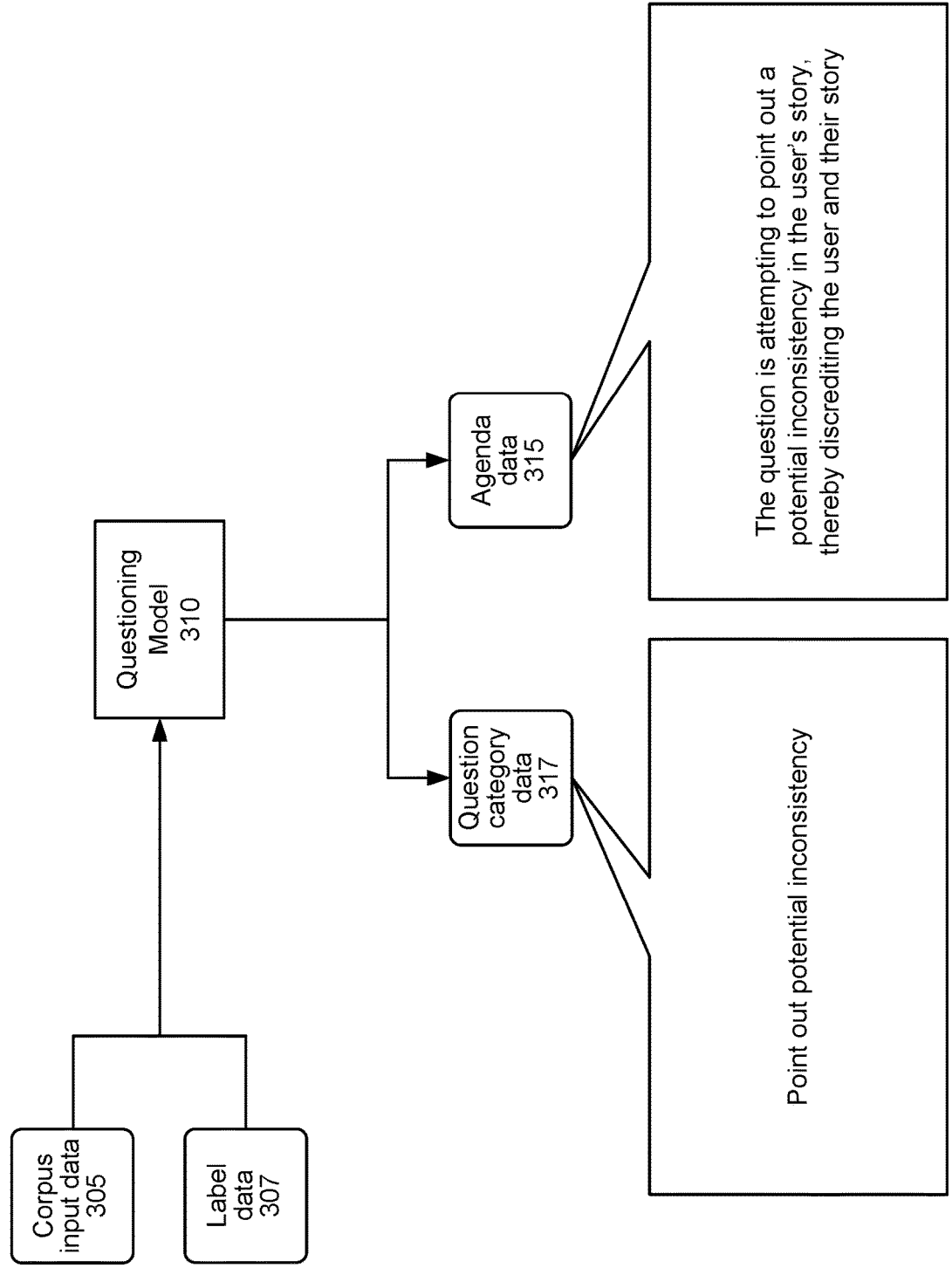

FIGS. 3A-3B illustrates an example method of training a ML model (i.e., an updated questioning model 320) to be configured to generate question data 325 (e.g., the ML model implemented by the agenda-driven question generation component 160).

As stated above, the system 100 may be configured (e.g., using the agenda-driven question generation component 160) to generate questions associated with a subject, which further a goal of a dialog, using a specific corpus of information (e.g., a corpus of information associated with the subject and/or associated with the goal, such as witness examinations, professional interviews, dispute resolutions, etc.). The corpus of information may include various portions of natural language information associated with the subject and/or the goal, which correspond to various formats (e.g., a format associated with a legal proceeding (e.g., direct and/or cross-examination of witnesses, a deposition, etc.), a format associated with a professional question-and-answer interaction (e.g., an interview, a panel discussion, etc.), a format associated with an informal, inquisitive, interaction (e.g., an oral examination, a gameshow, a study-buddy scenario, etc.), etc.)

As shown in FIG. 3A, configuring the system 100 using a corpus of information may comprise, during a first stage of training, training a questioning model 310 to generate agenda data 315 and question category data 317. During such training, the questioning model 310 may take as input corpus input data 305 corresponding to one or more natural language questions and/or responses associated with a subject and/or a goal (e.g., witness examinations, professional interviews, dispute resolutions, etc.) and label data 307 corresponding to one or more training labels associated with the corpus input data 305 (e.g., an agenda and/or question category associated with the corpus input data 305), and may be tasked with generating question category data 317 associated with the corpus input data 305 and agenda data 315 associated with the question category data 317 and/or the corpus input data 305. In some embodiments, the questioning model may be a sequence-to-sequence Transformer (e.g., a BART) including a classifier head. The Transformer may perform classification of the corpus input data 305 to generate the question category data 317. As stated above, the question category data 317 may be a natural language representation of a category to which a next predicted question (e.g., associated with the corpus input data 305) will correspond. For example, as shown in FIG. 3A, the question category data 317 may be "point out potential inconsistency." In some embodiments, the corpus input data 305 may include a description of a task (e.g., a goal) associated with the one or more questions and/or responses (e.g., learning/testing a subject, resolving a dispute/disagreement, engaging in a legal examination, practicing for an interview, engaging in an inquisitive discussion about a subject, etc.). The questioning model 310 may use the description of the task and the one or more questions and/or responses to generate the agenda data 315. As stated above, the agenda data 315 may represent a natural language explanation of a relevance of the next predicted question (e.g., associated with the corpus input data 305). For example, as shown in FIG. 3A, the agenda data may be "The question is attempting to point out a potential inconsistency in the user's story, thereby discrediting the user and their story." The content generation component may compare the agenda data 315 and the question category data 317 with the label data 307, and, based on the comparison, the questioning model 310 may be trained accordingly. In some embodiments, the updated questioning model 320 may correspond to the trained questioning model 310.

As stated above, the system may further use the corpus of information to train a component (e.g., the agenda-driven question generation component 160) to generate a predicted next question associated with the corpus of information, given the corpus of information and the natural language explanation and category associated with the predicted next question.

For example, as shown in FIG. 3B, the updated questioning model 320 may be trained to generate the question data 325, during a second stage of training. During such training, the updated questioning model 320 may take as input the corpus input data 305 used to train the questioning model 310 during the first stage of training, label data 319 corresponding to a predicted next question associated with the corpus input data 305, and the agenda data 315 and the question category data 317 generated by the questioning model 310 during the first stage of training. In some embodiments, the corpus input data input to the updated questioning model 320 may be different from the corpus input data input to the questioning model 310. The updated questioning model 320 may be tasked with generating question data 325 that is associated with the corpus input data 305, and which corresponds to the agenda data 315 and the question category data 317. For example, as shown in FIG. 3B, the question data 325 may be "So you're saying that your story is not based on anything specific you saw." The updated questioning model 320 may compare the question data 325 to the label data 319 and, based on the comparison, the updated questioning model 320 may be trained accordingly. In some embodiments, the ML model implemented by the agenda-driven question generation component 160 may correspond to the updated questioning model 320 resulting from the second stage of training.

Referring again to FIG. 1, the orchestrator component 130 may cause the question data 169 to be presented to the user 105 as output data 175. The orchestrator component 130 may send the question data 169 to the output rendering component 170 to generate output data 175. In embodiments where the question data 169 includes more than one natural language question, the orchestrator component may determine a single natural language question (e.g., a top-ranked natural language question) to send to the output rendering component 170. The output rendering component 170 may be any component configured to generate output data using the question data 169. For example, the output rendering component 170 may include or be a TTS component (e.g., the TTS component 780). For further example, the output rendering component 170 may include or be a component configured to generate visual output data (e.g., output image and/or video data) corresponding to the question data 169. As another example, the output rendering component 170 may include or be a component configured to generate interactive content (e.g., a graphical user interface (GUI) button) corresponding to the question data 169, which is to be presented to the user 105.

In situations where the output rendering component 170 is or includes a TTS component, the TTS component may process the question data 169 to generate output audio data including synthesized speech corresponding to the question data 169. The output rendering component 170 may send the output audio data to the orchestrator component 130, and the orchestrator component 130 may send the output audio data to the user device 110 for presentation to the user 105. Example processing of a TTS component 780 is described herein below with respect to FIG. 7.

In some situations, the orchestrator component 130 may cause the question data 169 to be presented as visual content (e.g., an image or video). In such situations, the orchestrator component 130 may send the question data 169 to a component of the system 100 to generate visual data corresponding to the question data 169, and the orchestrator component 130 may send the visual data to the user device 110 with an instruction to display the visual data.

In some situations, the orchestrator component 130 may cause the question data 169 to be presented as audio including synthesized speech, as well as visual content.

In some embodiments, the system 100 may include a component configured to determine whether a question generated by the agenda-driven question generation component 160 is a repeat of a question/information associated with the dialog (e.g., is semantically equivalent to question/information included in the dialog). For example, the system 100 may implement a ML model trained to determine whether a question generated by the agenda-driven question generation component 160 is a repeat of a question/information associated with the dialog. The ML model may be configured to take as input a natural language question (e.g., the question data 169), one or more user inputs and system-generated responses (e.g., the dialog history data 155 and/or the ASR output data 145), and may determine whether the natural language question is semantically equivalent to a question/information included the one or more user inputs and system-generated responses. During training, the ML model may take as input a natural language question, one or more natural language inputs, and training labels associated with the natural language question and the one or more natural language inputs, and may be tasked with generating a score for the natural language question representing whether the natural language question is semantically similar to the one or more natural language inputs. For example, if the score satisfies a condition, for example if the score meets or exceeds a threshold (e.g., 0.95 or higher), the score may represent that the natural language question is seman- tically similar to the one or more natural language inputs. Conversely, if the score satisfies a different condition, for example is below a threshold (e.g., below 0.95), then the score may represent that the natural language question is not semantically similar to the one or more natural language inputs. The ML model may compare the score to the training label. Based on the comparison, the ML model may be trained accordingly.

In some embodiments, the agenda-driven question generation component 160 may be configured to generate question data using ASR output data, without using dialog history data. For example the system 100 may receive input data corresponding to a user input. The user input may correspond to a first user input of a dialog, such that there is no dialog history data associated with the dialog yet. As stated above, the user input may include a request to generate a question associated with an subject (e.g., a description of a goal of the dialog) and a description of the subject.

The input data may be received by the orchestrator component 130. Similar to the input data 127, the input data may include various types of data, which may be processed by the system 100 as described above. In the situation where the input data includes input audio data, the orchestrator component 130 may send the input audio data to the ASR component 140, which may process the input audio data to generate ASR output data. The ASR component 140 may send the ASR output data to the orchestrator component 130, which may, in turn, send the ASR output data to the agenda-driven question generation component 160.

The system 100 may process the ASR output data to determine one or more entities included in the ASR output data. The system 100 may query the knowledge storage 220 for knowledge data(s) using the one or more entities. The system 100 may then send the knowledge data(s) to the agenda-driven question generation component 160. In some embodiments, the system 100 may use the knowledge data(s) to augment the ASR output data. For example, the ASR output data may be augmented such that the one or more entities include indications (e.g., tags) that the one or more entities are associated with the one or more of the knowledge data(s). In some embodiment, the agenda-driven question generation component 160 may be configured to determine the one or more entities, query the knowledge storage 220 for the knowledge data(s), and/or augment the ASR output data.

The ASR output data and the knowledge data(s) may be received at the question generator component 167 of the agenda-driven question generation component 160, which may process the ASR output data to extract one or more portions relating to the subject described in the ASR output data. For example, the question generator component 167 may include a component configured to parse the ASR output data for the one or more portions which most relate to the subject described in the user input. The question generator component 167 may process the one or more portions relating to the subject to generate question data corresponding to one or more questions associated with the ASR output data 145 (e.g., associated with the one or more portions relating to the subject described in the user input). In some embodiments, such processing by the agenda-driven question generation component 160 may assist the agenda-driven question generation component 160 in understanding the goal of the interaction, and further configure the agenda-driven question generation component 160 for generating further natural language questions during the dialog (e.g., as described herein above with respect to FIGS. 1-2).

In some embodiments, the question generator component 167 may be configured to generate the question data using the ML model implemented by the agenda-driven question generation component 160 to generate the question data 169, described herein above with respect to the FIGS. 2 and 3A-3B. For further example, the question generator component 167 may additionally implement any language model configured for question generation given a natural language input in a zero-shot setting (e.g., a chatbot model, a question generation model, etc.) in order to perform the abovementioned processing.

The agenda-driven question generation component 160 may send the question data to the orchestrator component 130. The orchestrator component may send the question data (or a top-ranked question included in the question data) to the output rendering component 170, which may process as described above to generate output data corresponding to the question data, and the output rendering component may send the output data to the orchestrator component 130. The orchestrator component 130 may process as described above to cause the user device 110 to present the output data to the user 105.

In some embodiments, the agenda-driven question generation component 160 may include another component configured to generate the question data.

In some embodiments, after generating the question data (e.g., the question data 169 or the question data generated without using dialog history data), the agenda-driven question generation component 160 may be configured to determine whether the question data 169 is associated with the goal of the dialog (e.g., is associated with the ASR output data 145 and/or the dialog history data 155). For example, the agenda-driven question generation component 160 may implement a ML model configured to take as input the question data 169 and the ASR output data 145 and/or the dialog history data 155, and output a score representing how semantically similar the question data 169 is to the ASR output data 145 and/or the dialog history data 155. Based on the score, the agenda-driven question generation component 160 may determine to generate another instance of question data, or may determine to send the question data 169 to the orchestrator component 130 for output. In some embodiments the ML model may correspond to a semantic matching model (e.g., Bilingual Evaluation Understudy with Representations from Transformers (BLEURT)).

In some embodiments, after generating the question data (e.g., the question data 169 or the question data generated without using dialog history data), the agenda-driven question generation component 160 may be configured to determine whether the question data is associated with the goal of the dialog (e.g., is associated with the ASR output data and/or the dialog history data 155). For example, the agenda-driven question generation component 160 may implement a ML model configured to take as input the question data 169 and the ASR output data 145 and/or the dialog history data 155, and output a score representing how semantically similar the question data 169 is to the ASR output data 145 and/or the dialog history data 155. In some embodiments, the agenda-driven question generation component 160 may further use the score to determine a coherence of the question data (e.g., whether the question data 169 is fluent and conveys the goal of the ASR output data 145 and/or the dialog history data 155). Based on the score, the agenda-driven question generation component 160 may determine to generate another instance of question data, or may determine to send the question data to the orchestrator component 130 for output. In some embodiments the ML model may correspond to a natural language generation evaluation metric (e.g., BLEURT).

Figure 4A:
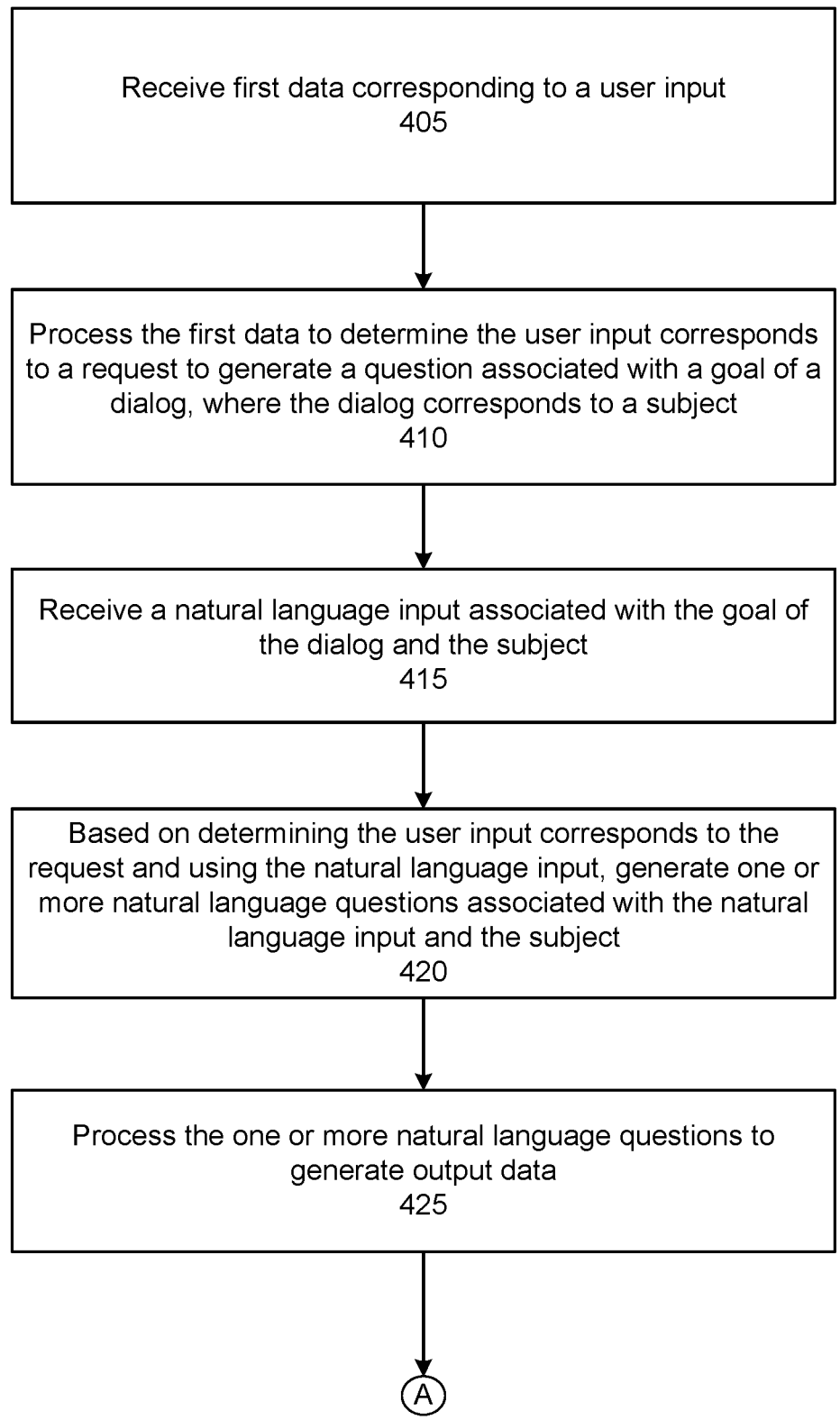
FIGS. 4A-4C are an example flowchart illustrating example processing that may be performed by the system to generate one or more natural language questions during a dialog, according to embodiments of the present disclosure.
Figure 4B:
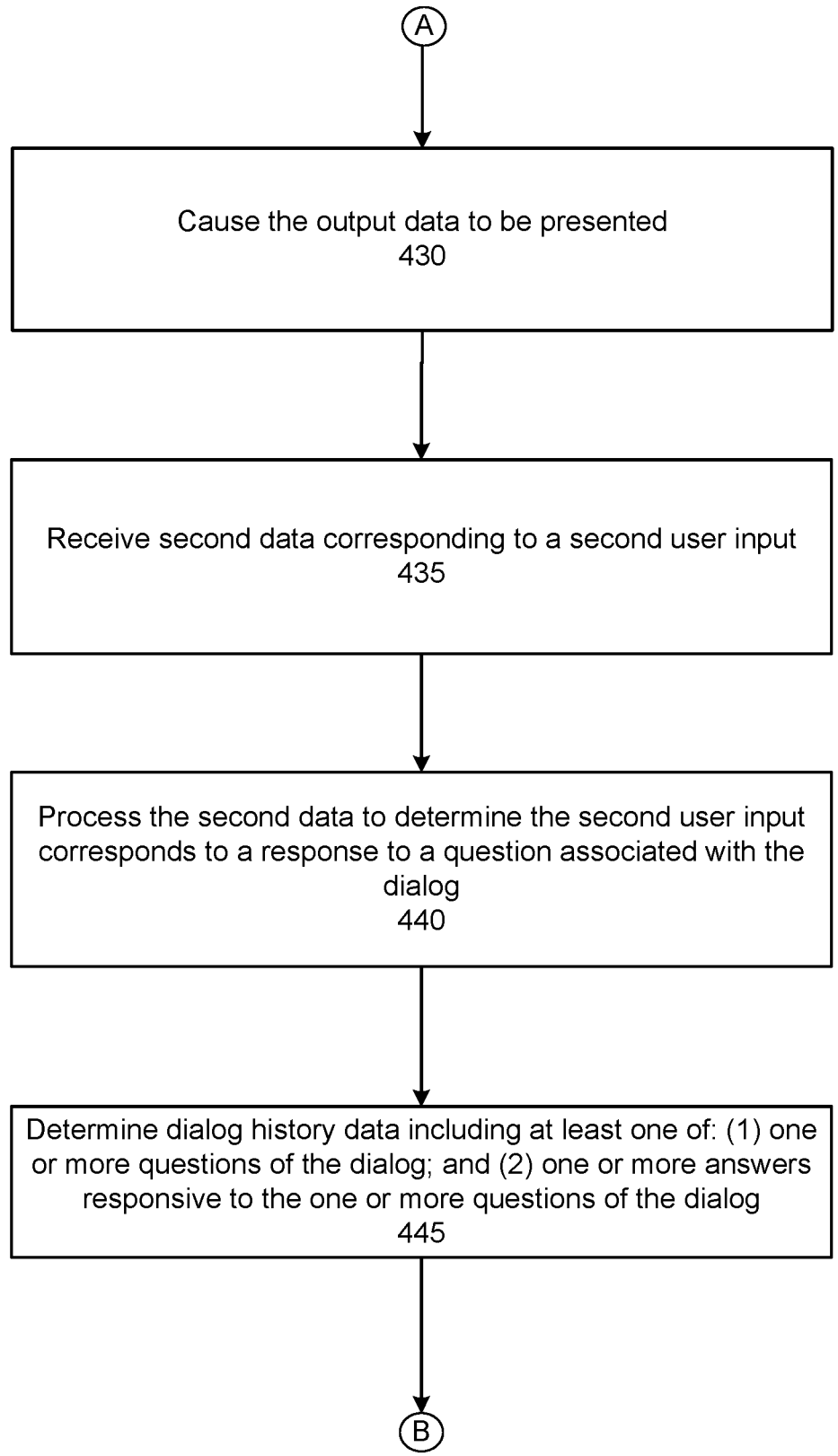
Figure 4C:
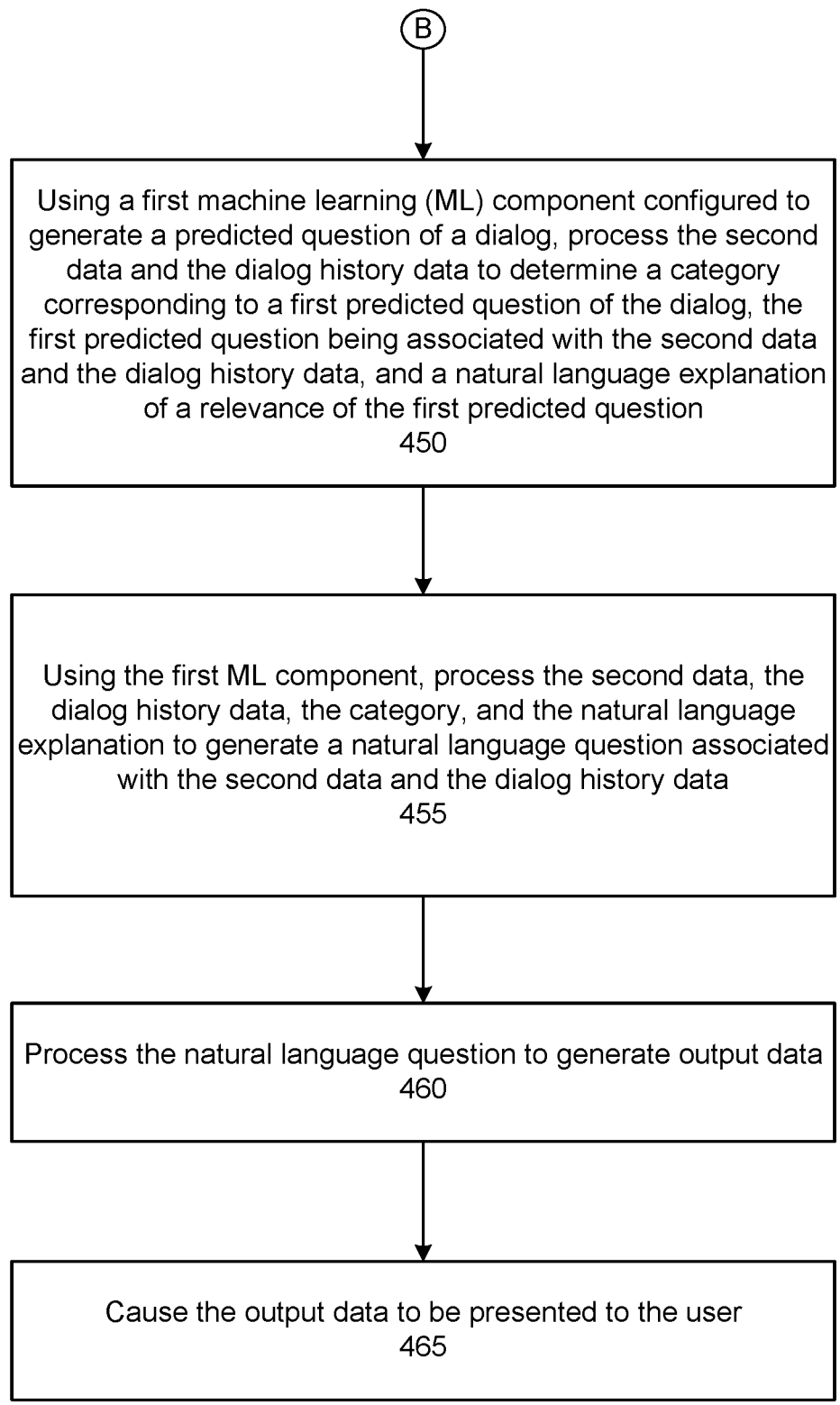

FIGS. 4A-4C is an example flowchart illustrating example processing that may be performed by the system 100 to generate one or more natural language questions during a dialog.

As shown in FIG. 4A, the system 100 of the present disclosure may receive (405) first data corresponding to a user input. The system may process (410) the first data to determine the user input corresponds to a request to generate a question associated with a goal of a dialog, where the dialog corresponds to a subject. For example, if the first data corresponds to input audio data, the system may perform ASR processing on the first data to determine ASR output data including a transcript of the user input, and may perform NLU processing on the ASR output data to determine NLU output data including an intent of the user input. For further example, if the first data corresponds to input text (or tokens), then the system may perform NLU processing on the first data. Such a user input may be, for example, "Enter directed questioning mode," "Can you help settle this dispute," "Can you weigh in on this situation," or the like.

The system 100 may receive (415) a natural language input associated with the goal of the dialog and the subject. For example, the natural language input may include information related to a subject (e.g., a legal case, a dispute/argument, a job position, a discussion topic, a topic of study, etc.) and/or a description of the particular goal that is to be furthered by generation and output of questions by the user device 110/system component(s) 120. In some embodiments, the natural language input may correspond to information included in the user input. For example, the user input may be "I have a legal examination coming up, can you help me come up with some questions for the examination of the witnesses?" or "I have a legal examination coming up, here are some details about the case, [details] can you help me come up with some questions for the examination of the witnesses?" For further example, the user input may be "I am studying for a test about [subject], can you ask me questions?" or "I am studying for a test about [subject], in particular [entity name], can you ask me questions?" For further example, the user input may be "I have an interview for [Job Position], can you help me prepare?" or "I have an interview for [Job Position], here are some details about the position, can you help me prepare?" As another example, the user input may be "Can you help me settle this dispute? Here are some details, [details]." Another example may be that the user input is "Ask me questions about [Subject]" or "Ask me questions based on the following information: [Subject]."

Based on determining the user input corresponds to the request and using the natural language input, the system 100 may further generate (420) one or more natural language questions associated with the natural language input and the subject. For example, the system may use the agenda-driven question generation component 160 to generate the one or more natural language questions associated with the natural language input and the subject.

The system may process (425) the one or more natural language questions to generate output data. For example, the system 100 may send the one or more natural language questions to the output rendering component 170 to generate the output data.

As shown in FIG. 4B, the system may cause (430) the output data to be presented. Thereafter, the system 100 may receive (435) a second data corresponding to a second user input. The system may process (440) the second data to determine the second user input corresponds to a response to a question associated with the dialog. For example, the second natural language input may be a response by a user (e.g., a user associated with the first user input or a different user) to the one or more questions generated by the system 100 or to one or more questions asked by a different user.

The system 100 may determine (445) dialog history data including at least one of (1) one or more questions of the dialog; and (2) one or more answers responsive to the one or more questions of the dialog. For example, the dialog history data may include one or more questions and/or responses generated by the system 100 or originating from one or more users.

As shown in 4C, using a first ML component configured to generate a predicted question of a dialog, the system 100 may further process (450) the second data and the dialog history data to determine a category corresponding to a first predicted question of the dialog, the first predicted question being associated with the second user input and the dialog history data, and a natural language explanation of a relevance of the first predicted question. For example, the system 100 may cause the metadata generator component 162 to process the second data and the dialog history data to determine the category and the natural language explanation.

Using the first ML component, the system 100 may process (455) the second data, the dialog history data, the category, and the natural language explanation to generate a natural language question associated with the second user input and the dialog history data. For example, the system 100 may cause the question generator component 167 to process the second data and the dialog history data to determine the natural language question. In some instances, for example where the dialog includes a first user asking questions to a second user, the natural language question may be configured to be asked by the first user to the second user. In other instances, for example where the dialog includes one or more users engaging in communication with the system 100, the natural language question may be configured to be asked by the system 100 to the one or more users.

The system 100 may further process (460) the natural language question to generate output data. For example, as discussed above, the output rendering component 170 may use the natural language question to generate the output data. The system 100 may cause (465) the output data to be presented.

Figure 5:
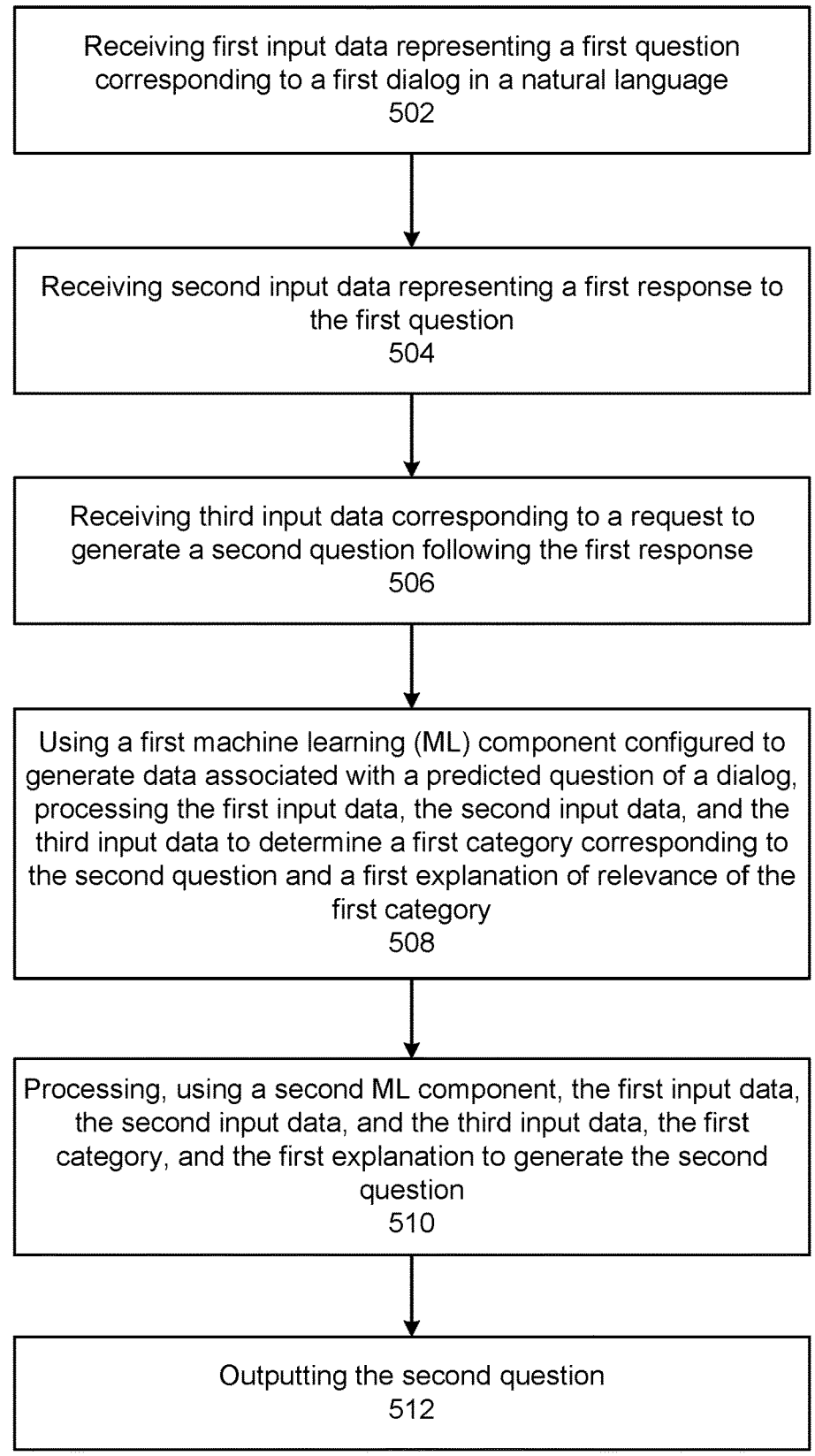
FIG. 5 is an example flowchart illustrating example processing that may be performed by the system to generate a natural language question, according to embodiments of the present disclosure.

FIG. 5 is an example flowchart illustrating example processing that may be performed by the system 100 to generate a natural language question.

The system 100 may receive (502) receive first input data representing a first question corresponding to a first dialog in a natural language. For example, the first question may be "Where were you when the vase broke?" As discussed above, the first question may be asked by a first user to a second user or by the first user to the system 100.

The system may receive (504) second input data representing a first response to the first question. For example, the first response may be "I was alone in the room with the vase when it broke." The first response may be responsive to the first question asked by the first user and may be provided by the second user. The first response may be responsive to another question, for example, a question output by the system 100.

The system may receive (506) third input data corresponding to a request to generate a second question following the first response. For example, the request may be "Can you help me come up with a related question," or the like.

Using a first machine learning (ML) component configured to generate data associated with a predicted question of a dialog, the system may process (508) the first input data, the second input data, and the third input data to determine a first category corresponding to the second question and a first explanation of relevance of the first category. For example, the first category may be "Leading question" or "logical conclusion" and the first explanation of relevance may be "Because they said they were the only one in the room when the vase broke, it is likely that they were the one who broke the vase."

The system may process (510), using a second ML component, the first input data, the second input data, the third input data, the first category, and the first explanation to generate the second question. For example, the second question may be "Wouldn't you say that if you were the only one in the room when the vase broke, that it follows that you likely broke the vase." In some embodiments, the second question may be configured to be output (e.g., asked) to the first user by the system 100. In some embodiments, the second question may be configured to be asked during the first dialog. For example, the second question may configured to be asked by the first user to the second user during the dialog.

The system 100 may output (512) the second question.

FIGS. 6A-6C is a signal flow diagram illustrating example operations of the system 100 to generate a natural language question. As shown, the flow of operations may involve a number of different components including the orchestrator component 130, dialog storage component 150, and skill(s) 690.

As shown in FIG. 6A, the orchestrator component 130 may receive (615) user input data. As described above, the user input data may include various forms of input including input audio data and input text (or tokenized) data. In the instance where the user input data includes input audio data 135, the orchestrator component 130 may send the input audio data 135 to the ASR component 140, which may process as discussed herein above to generate (620) ASR output data 145, which may be sent to the orchestrator component 130.

The orchestrator component 130 (and/or another component) may determine (625) the user input data indicates that a question is to be output. For example, in some embodiments, the user input data may correspond to an initial request to output a question as part of a dialog between one or more users and/or the system 100. In such embodiments, as described above, the user input data may include information related to a subject (e.g., a legal case, a dispute/argument, a job position, a discussion topic, a topic of study, etc.) and/or a description of a particular goal that is to be furthered by output of the questions. For further example, in some embodiments, the user input data may correspond to a response of one or more users to a question (e.g., a question asked by one or more other users and/or the system 100). The orchestrator component 130 may send the ASR output data 145 (or, in the instance where the user input data includes input text (or tokenized) data, the input text (or tokenized) data) to the NLU component 760 (discussed below in reference to FIG. 7) to generate NLU output data including an intent corresponding to the user input data. The orchestrator may determine that the user input data requests output of the question using the NLU output data (e.g., based on the intent).

The orchestrator component 130 may query the dialog storage component 150 for the dialog history data 155. As described above, the orchestrator component 130 may query the dialog storage component 150 using a user identifier of the user 105 and/or a device identifier of the user device 110 and/or a dialog identifier associated with the input data 127, which may be determined by another component of the system component(s) 120. In some embodiments, there may not be dialog history data associated with the dialog between the one or more users and/or the system 100 (e.g., in the instance where the user input data corresponds to the initial request to output a question as part of a dialog). In such instances, the dialog storage may indicate that there is no corresponding dialog history data (e.g., may return a NULL value). In certain instances there may be an ongoing dialog with a particular skill component 690 in which case the skill component 690 may interact with the dialog storage component 150 to determine the dialog history data 155.

The orchestrator component 130 may send natural language data 630 and the dialog history data 155 to a skill component 690. The natural language data 630 may correspond to the ASR output data 145, the text (or tokenized) user input data, and/or the NLU output data. In instances where there is not any dialog history data associated with the dialog, the orchestrator component 130 may only the natural language data 630 to the skill component 690.

The skill component 690 may be configured to control processing performed with respect to the dialog (for example in conjunction with dialog manager component 772 discussed below). In some embodiments, the skill component 690 may be configured to control processing performed with respect to a dialog associated with a specific subject and/or goal. Examples of such skills 690 may include a skill configured for dialogs associated with legal examinations, a skill configured for dialogs associated with a dispute/argument, a skill configured for dialogs associated with job interviews, a skill configured for dialogs associated with panel discussions, a skill configured for dialogs associated with study/testing tactics, a skill configured for dialogs associated with trivia, a generalized chatbot skill, a topic-specific chatbot skill, a skill configured to help a user learn a language, etc. As can be appreciated, a wide variety of different skill components 690 may be used. In some embodiments, the system 100 may include one or more skill components 690, and the orchestrator component 130 may send the natural language data 630 and/or dialog history data 155 to the particular skill component 690 associated with the subject and/or goal associated with the current dialog. In some embodiments, the skill component 690 may be configured to determine the dialog history data 155, in which case the orchestrator component 130 may not query the dialog storage component 150 for the dialog history data 155 or may not send the dialog history data 155 to the skill component 690.

As shown in FIG. 6B, the skill component 690 may determine (635) context data 640 associated with the natural language data 630 and/or the dialog history data 155, and may send the context data 640 to the orchestrator component 130. The context data 640 may correspond to data associated with dialog between the one or more users and/or the system 100 including the dialog history data 155 (e.g., in the instance where the orchestrator component 130 does not query the dialog storage component 150 for the dialog history data 155), a representation of the subject and/or goal of the dialog, and/or data associated with the subject and/or goal of the dialog (e.g., information associated with legal examinations, job interviews, trivia, study subject, etc.). The skill component 690 may send the context data 640 to the orchestrator component 130.

The orchestrator component 130 may query the knowledge storage 220 for knowledge data(s) 225 associated with the natural language data 630 and/or the dialog history data 155. For example, as described above, the orchestrator component 130 may query the knowledge storage 220 for the knowledge data(s) 225 using one or more entities included in the natural language data 630 and/or the dialog history data 155. The knowledge storage 220 may determine (645) knowledge data(s) 225 associated with the natural language data 630 and/or the dialog history data 155 and send the knowledge data(s) 225 to the orchestrator component 130.

As shown in FIG. 6C, the orchestrator component 130 may send the natural language data 630, the dialog history data 155, the context data 640, and the knowledge data(s) 225 to the agenda-driven question generation component 160. In instances where the is not any dialog history data 155 associated with the dialog, the orchestrator component 130 may only send the natural language data 630, the context data 640, and the knowledge data(s) 225 to the agenda-driven question generation component 160. In some embodiments, the agenda-driven question generation component 160 may be included in the skill component 690, in which case, the skill component 690 may not send the context data 640 to the orchestrator component 130 and the orchestrator component 130 may only send the knowledge data(s) 225 to the agenda-driven question generation component 160. In some embodiments, the skill component 690 may further included the knowledge storage 220, and may be configured to query the knowledge storage 220 for the knowledge data(s) 225.

As described above, the agenda-driven question generation component 160 may generate (650) question category data 164 associated with a predicted question of the dialog and generate (655) agenda data 166 associated with the predicted question of the dialog (e.g., using the metadata generator component 162). The agenda-driven question generation component 160 may further generate (660) question data 169 using the natural language data 630, the dialog history data 155 (in the instance where there is dialog history data associated with the dialog), the question category data 164, and the agenda data 166 (e.g., using the question generator component 167). As described above, the question data 169 may include one or more questions, and may be configured to be asked to the user 105 associated with the user input data (e.g., by being output directly to the user 105 and/or being asked by one or more other users of the dialog to the user 105). The agenda-driven question generation component 160 may send the question data 169 to the orchestrator component 130.

The orchestrator component 130 may cause (665) output data 175 corresponding to the question data 169 to be presented. For example, as discussed above the orchestrator component may send the question data 169 to the output rendering component 170 to generate the output data 175.

Figure 7:
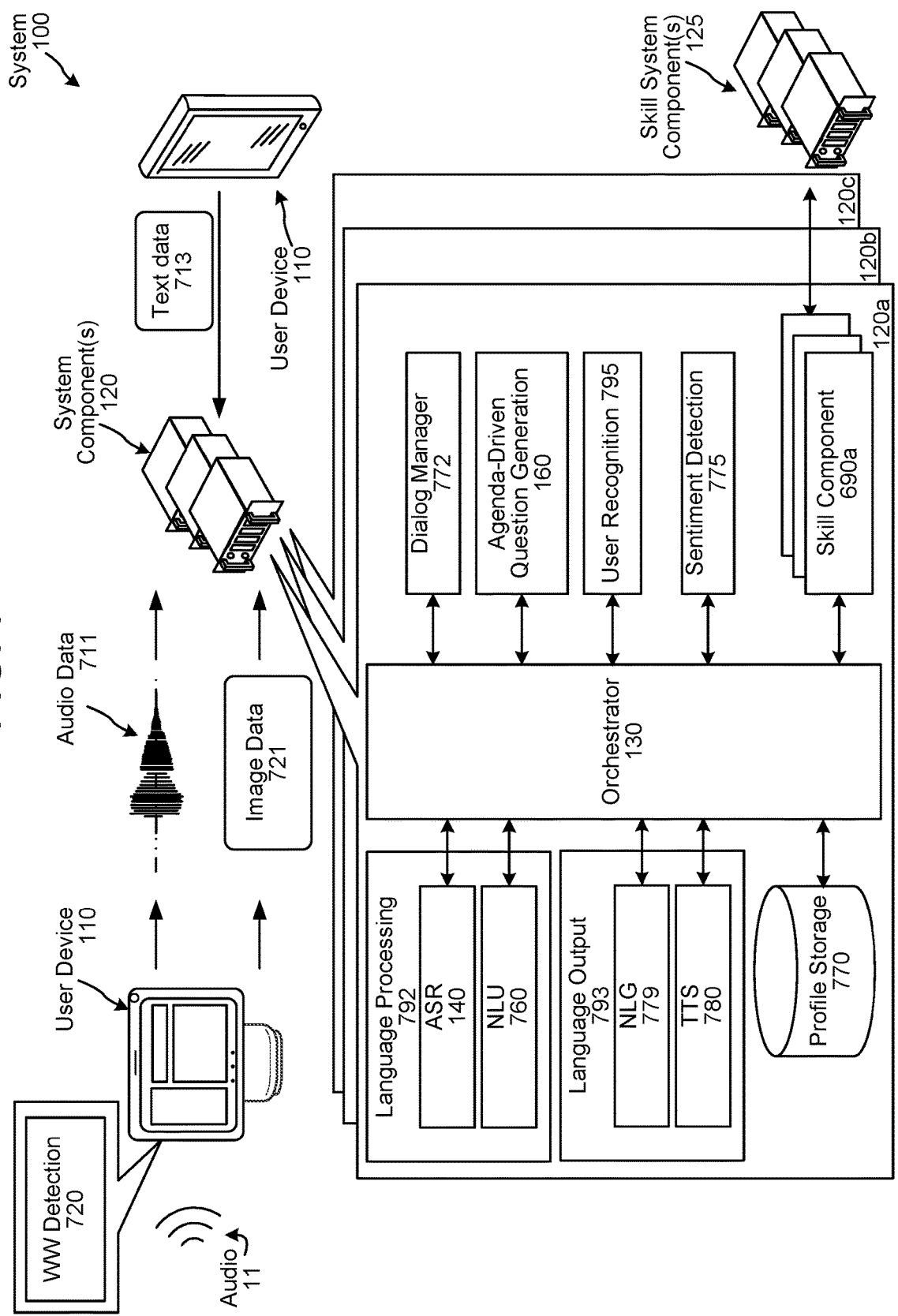
FIG. 7 is a conceptual diagram of components of the system, according to embodiments of the present disclosure.

The system 100 may operate using various components as described in FIG. 7. The various components may be located on same or different physical devices. Communication between various components may occur directly or across a network(s) 199. The user device 110 may include audio capture component(s), such as a microphone or array of microphones of a user device 110, captures audio 11 and creates corresponding audio data. Once speech is detected in audio data representing the audio 11, the user device 110 may determine if the speech is directed at the user device 110/system component(s) 120. In at least some embodiments, such determination may be made using a wakeword detection component 720. The wakeword detection component 720 may be configured to detect various wakewords. In at least some examples, each wakeword may correspond to a name of a different digital assistant. An example wakeword/digital assistant name is "Alexa." In another example, input to the system may be in form of text data 713, for example as a result of a user typing an input into a user interface of user device 110. Other input forms may include indication that the user has pressed a physical or virtual button on user device 110, the user has made a gesture, etc. The user device 110 may also capture images using camera(s) 918 of the user device 110 and may send image data 721 representing those image(s) to the system component(s) 120. The image data 721 may include raw image data or image data processed by the user device 110 before sending to the system component(s) 120. The image data 721 may be used in various manners by different components of the system to perform operations such as determining whether a user is directing an utterance to the system, interpreting a user command, responding to a user command, etc.

The wakeword detection component 720 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 720 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 720 and/or input is detected by an input detector, the user device 110 may "wake" and begin transmitting audio data 711, representing the audio 11, to the system component(s) 120. The audio data 711 may include data corresponding to the wakeword; in other embodiments, the portion of the audio corresponding to the wakeword is removed by the user device 110 prior to sending the audio data 711 to the system component(s) 120. In the case of touch input detection or gesture based input detection, the audio data may not include a wakeword.

In some implementations, the system 100 may include more than one system component(s) 120. The system component(s) 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 720 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 690 of one or more system component(s) 120.

Upon receipt by the system component(s) 120, the audio data 711 may be sent to an orchestrator component 130. The orchestrator component 130 may include memory and logic that enables the orchestrator component 130 to transmit various pieces and forms of data to various components of the system, as well as perform other operations as described herein.

The orchestrator component 130 may send the audio data 711 to a language processing component 792. The language processing component 792 (sometimes also referred to as a spoken language understanding (SLU) component) includes an automatic speech recognition (ASR) component 140 and a natural language understanding (NLU) component 760. The ASR component 140 may transcribe the audio data 711 into text data. The text data output by the ASR component 140 represents one or more than one (e.g., in the form of an N-best list) ASR hypotheses representing speech represented in the audio data 711. The ASR component 140 interprets the speech in the audio data 711 based on a similarity between the audio data 711 and pre-established language models. For example, the ASR component 140 may compare the audio data 711 with models for sounds (e.g., acoustic units such as phonemes, senons, phones, etc.) and sequences of sounds to identify words that match the sequence of sounds of the speech represented in the audio data 711. The ASR component 140 sends the text data generated thereby to an NLU component 760, via, in some embodiments, the orchestrator component 130. The text data sent from the ASR component 140 to the NLU component 760 may include a single top-scoring ASR hypothesis or may include an N-best list including multiple top-scoring ASR hypotheses. An N-best list may additionally include a respective score associated with each ASR hypothesis represented therein.

The language processing system 792 may further include a NLU component 760. The NLU component 760 may receive the text data from the ASR component. The NLU component 760 may attempts to make a semantic interpretation of the phrase(s) or statement(s) represented in the text data input therein by determining one or more meanings associated with the phrase(s) or statement(s) represented in the text data. The NLU component 760 may determine an intent representing an action that a user desires be performed and may determine information that allows a device (e.g., the user device 110, the system component(s) 120, a skill component 690, a skill system component(s) 125, etc.) to execute the intent. For example, if the text data corresponds to "play the 5th Symphony by Beethoven," the NLU component 760 may determine an intent that the system output music and may identify "Beethoven" as an artist/composer and "5th Symphony" as the piece of music to be played. For further example, if the text data corresponds to "what is the weather," the NLU component 760 may determine an intent that the system output weather information associated with a geographic location of the user device 110. In another example, if the text data corresponds to "turn off the lights," the NLU component 760 may determine an intent that the system turn off lights associated with the user device 110 or the user 105. However, if the NLU component 760 is unable to resolve the entity—for example, because the entity is referred to by anaphora such as "this song" or "my next appointment"—the language processing system 792 can send a decode request to another language processing system 792 for information regarding the entity mention and/or other context related to the utterance. The language processing system 792 may augment, correct, or base results data upon the audio data 711 as well as any data received from the other language processing system 792.

The NLU component 760 may return NLU results data (which may include tagged text data, indicators of intent, etc.) back to the orchestrator component 130. The orchestrator component 130 may forward the NLU results data to a skill component(s) 690. If the NLU results data includes a single NLU hypothesis, the NLU component 760 and the orchestrator component 130 may direct the NLU results data to the skill component(s) 690 associated with the NLU hypothesis. If the NLU results data includes an N-best list of NLU hypotheses, the NLU component 760 and the orchestrator component 130 may direct the top scoring NLU hypothesis to a skill component(s) 690 associated with the top scoring NLU hypothesis. The system may also include a post-NLU ranker which may incorporate other information to rank potential interpretations determined by the NLU component 760. The local user device 110 may also include its own post-NLU ranker, which may operate similarly to the post-NLU ranker.

A skill component may be software running on the system component(s) 120 that is akin to a software application. That is, a skill component 690 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 690. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 690 may operate in conjunction between the system component(s) 120 and other devices, such as the user device 110, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

A skill system component(s) 125 may communicate with a skill component(s) 690 within the system component(s) 120 and/or directly with the orchestrator component 130 or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 690 dedicated to interacting with the skill system component(s) 125. Unless expressly stated otherwise, reference to a skill, skill device, or skill component may include a skill component 690 operated by the system component(s) 120 and/or skill operated by the skill system component(s) 125. Moreover, the functionality described herein as a skill or skill may be referred to using many different terms, such as an action, bot, app, or the like. The skill component 690 and or skill system component(s) 125 may return output data to the orchestrator component 130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 772/872 that manages and/or tracks a dialog between a user and a device.

The dialog manager component 772 may associate a dialog session identifier with the dialog upon identifying that the user is engaging in a dialog with the user. The dialog manager component 772 may track a user input and the corresponding system generated response to the user input as a turn. The dialog session identifier may correspond to multiple turns of user input and corresponding system generated response. The dialog manager component 772 may transmit data identified by the dialog session identifier directly to the orchestrator component 130 or other component. For example, in some embodiments, the dialog storage component 150 may be included in the dialog manager component 772. The dialog manager component 772 may use the dialog session identifier associated with the dialog to determine the dialog history data 155, and send the dialog history data 155 to the orchestrator component 130. Depending on system configuration the dialog manager component 772 may determine the appropriate system generated response to give to a particular utterance or user input of a turn. For example, in some embodiments, the agenda-driven question generation component 160 may be included in the dialog manager component 772, and the dialog manager component 772 may be configured to facilitate the generation of the question data 169 using the agenda-driven question generation component 160. Or creation of the system generated response may be managed by another component of the system (e.g., the language output component 793, NLG 779, the orchestrator component 130, the agenda-driven question generation component 160, etc.) while the dialog manager component 772 selects the appropriate responses. Alternatively, another component of the system component(s) 120 may select responses using techniques discussed herein. The text of a system generated response may be sent to a TTS component 780 for creation of audio data corresponding to the response. The audio data may then be sent to a user device (e.g., user device 110) for ultimate output to the user. Alternatively (or in addition) a dialog response may be returned in text or some other form.

The dialog manager component 772 may receive the ASR hypothesis/hypotheses (i.e., text data) and make a semantic interpretation of the phrase(s) or statement(s) represented therein. That is, the dialog manager component 772 determines one or more meanings associated with the phrase(s) or statement(s) represented in the text data based on words represented in the text data. The dialog manager component 772 determines a goal corresponding to an action that a user desires be performed as well as pieces of the text data that allow a device (e.g., the user device 110, the system component(s) 120, a skill component 690, a skill system component(s) 125, etc.) to execute the intent. If, for example, the text data corresponds to "what is the weather," the dialog manager component 772 may determine that that the system component(s) 120 is to output weather information associated with a geographic location of the user device 110. In another example, if the text data corresponds to "turn off the lights," the dialog manager component 772 may determine that the system component(s) 120 is to turn off lights associated with the device(s) 110 or the user(s) 5.

The dialog manager component 772 may send the results data to one or more skill component(s) 690. If the results data includes a single hypothesis, the orchestrator component 130 may send the results data to the skill component(s) 690 associated with the hypothesis. If the results data includes an N-best list of hypotheses, the orchestrator component 130 may send the top scoring hypothesis to a skill component(s) 690 associated with the top scoring hypothesis.

The system component(s) 120 includes a language output component 793. The language output component 793 includes a natural language generation (NLG) component 779 and a text-to-speech (TTS) component 780. The NLG component 779 can generate text for purposes of TTS output to a user. For example, the NLG component 779 may generate text corresponding to instructions corresponding to a particular action for the user to perform. The NLG component 779 may generate appropriate text for various outputs as described herein. The NLG component 779 may include one or more trained models configured to output text appropriate for a particular input. The text output by the NLG component 779 may become input for the TTS component 780 (e.g., output text data discussed below). Alternatively or in addition, the TTS component 780 may receive text data from a skill component 690 or other system component for output. In some embodiments, the NLG component may include the agenda-driven question generation component 160.

The NLG component 779 may include a trained model. The NLG component 779 generates text data from dialog data received by the dialog manager component 772 such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the TTS component 780.

The TTS component 780 may generate audio data (e.g., synthesized speech) from text data using one or more different methods. Text data input to the TTS component 780 may come from a skill component 690, the orchestrator component 130, or another component of the system. In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 711 representing the commands to the system component(s) 120 for processing, after which the system component(s) 120 may return output data that can cause the user device 110 to engage its camera.

The system component(s) 120 may include a user recognition component 795 that recognizes one or more users using a variety of data. However, the disclosure is not limited thereto, and the user device 110 may include a user recognition component 895 instead of and/or in addition to user recognition component 795 of the system component(s) 120 without departing from the disclosure. User recognition component 895 operates similarly to user recognition component 795.

The user recognition component 795 may take as input the audio data 711 and/or text data output by the ASR component 140. The user recognition component 795 may perform user recognition by comparing audio characteristics in the audio data 711 to stored audio characteristics of users. The user recognition component 795 may also perform user recognition by comparing biometric data (e.g., fingerprint data, iris data, etc.), received by the system in correlation with the present user input, to stored biometric data of users assuming user permission and previous authorization. The user recognition component 795 may further perform user recognition by comparing image data (e.g., including a representation of at least a feature of a user), received by the system in correlation with the present user input, with stored image data including representations of features of different users. The user recognition component 795 may perform additional user recognition processes, including those known in the art.

The user recognition component 795 determines scores indicating whether user input originated from a particular user. For example, a first score may indicate a likelihood that the user input originated from a first user, a second score may indicate a likelihood that the user input originated from a second user, etc. The user recognition component 795 also determines an overall confidence regarding the accuracy of user recognition operations.

Output of the user recognition component 795 may include a single user identifier corresponding to the most likely user that originated the user input. Alternatively, output of the user recognition component 795 may include an N-best list of user identifiers with respective scores indicating likelihoods of respective users originating the user input. The output of the user recognition component 795 may be used to inform NLU processing as well as processing performed by other components of the system. For example, the output of the user recognition component 795 may be used by the system 100 to identify a dialog between the user associated with the user identifier and the system 100 (e.g., using a dialog session identifier associated with the identified user), and to determine the dialog history data 155. In some embodiments, for example where the system 100 is generating one or more questions for a first user to ask a second user, the system 100 may use the output of the user recognition component 795 to identify that the user currently interacting with the system 100 is indeed the first user that the system 100 is to be generating the questions for. If the system 100 determines that the user interacting with the system 100 is not the first user, the system 100 may not generate and/or output the requested question(s), for example, until the first user is determined to be interacting with the system 100.

The system 100 (either on user device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 770 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 770 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 775 that may be configured to detect a sentiment of a user from audio data representing speech/utterances from the user, image data representing an image of the user. The sentiment detection component 775 may be included in system component(s) 120, as illustrated in FIG. 7, although the disclosure is not limited thereto and the sentiment detection component 775 may be included in other components without departing from the disclosure. For example, the sentiment detection component 875 may be included in the user device 110, as a separate component, etc. Sentiment detection component 875 may operate similarly to sentiment detection component 775. The system component(s) 120 may use the sentiment detection component 775 to, for example, customize a response for a user based on an indication that the user is happy or frustrated.

In some embodiments, the system 100 may use the output of the sentiment detection component 775 to generate natural language questions. In such embodiments, the agenda-driven question generation component 160 may be further configured to consider a sentiment of the user 105 when processing the ASR output data 145 and the dialog history data 155 to generate the question data 169. For example, in response to a question of "Have you seen the defendant before" the system may receive a user input of "Yes, I have seen the defendant before." Additionally, the system 100 may further determine a sentiment of the user representing that the user is upset. The system may use at least the user input and the sentiment to determine that the user may have a negative opinion of the "defendant" and that the relationship between the user and the "defendant" should be questioned further. As such, the system 100 may generate a natural language question querying the relationship between the user and the "defendant."

Figure 8:
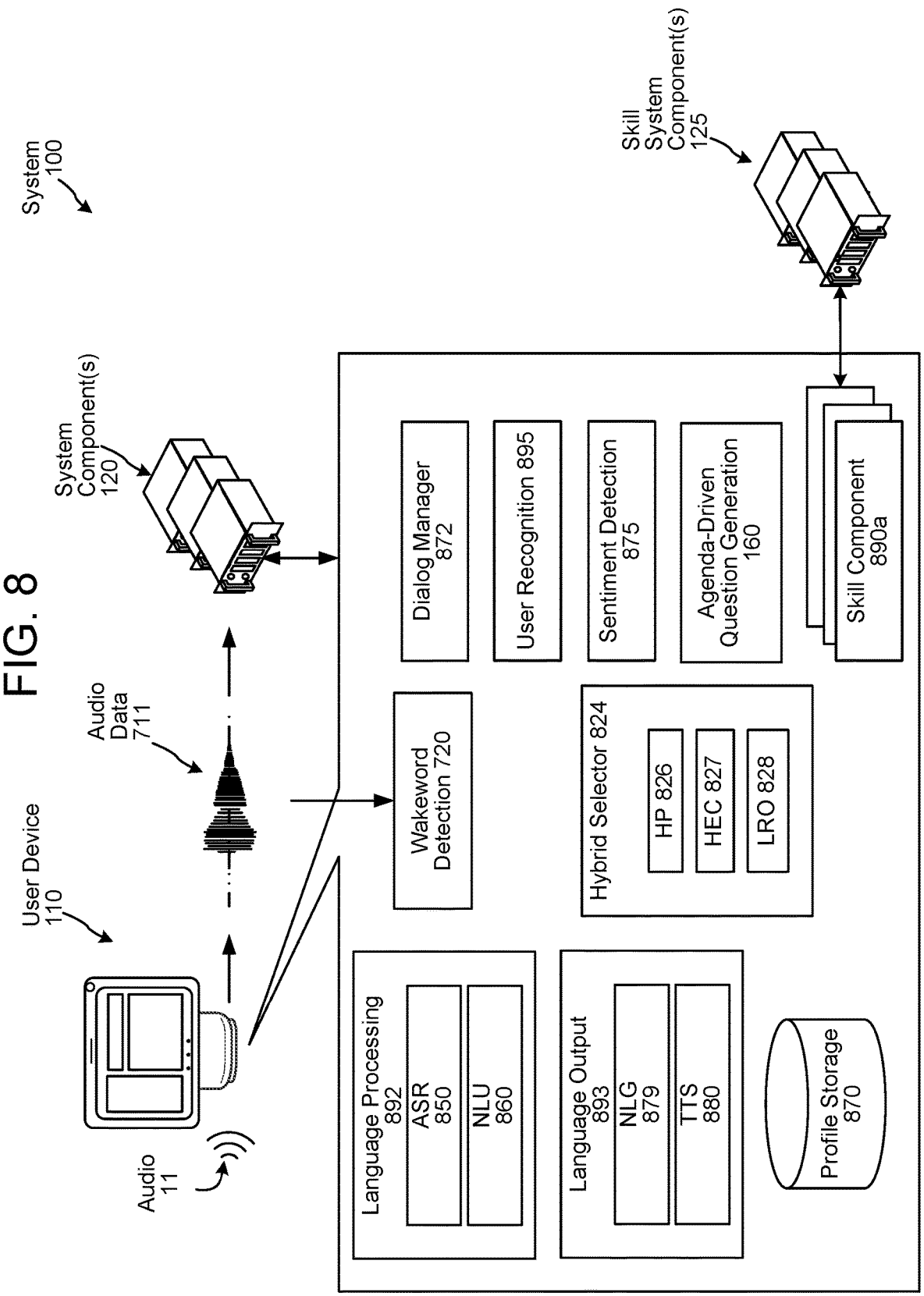
FIG. 8 is a conceptual diagram illustrating components that may be included in a device, according to embodiments of the present disclosure.

Although the components of FIG. 7 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 8 illustrates such a configured user device 110.

In at least some embodiments, the system component(s) 120 may receive the audio data 711 from the user device 110, to recognize speech corresponding to a spoken input in the received audio data 711, and to perform functions in response to the recognized speech. In at least some embodiments, these functions involve sending directives (e.g., commands), from the system component(s) 120 to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) 120 over the network(s) 199, some or all of the functions capable of being performed by the system component(s) 120 may be performed by sending one or more directives over the network(s) 199 to the user device 110, which, in turn, may process the directive(s) and perform one or more corresponding actions. For example, the system component(s) 120, using a remote directive that is included in response data (e.g., a remote response), may instruct the user device 110 to output an audible response (e.g., using TTS processing performed by an on-device TTS component 880) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 7, the user device 110 may include a wakeword detection component 720 configured to compare the audio data 711 to stored models used to detect a wakeword (e.g., "Alexa") that indicates to the user device 110 that the audio data 711 is to be processed for determining NLU output data (e.g., slot data that corresponds to a named entity, label data, and/or intent data, etc.). In at least some embodiments, a hybrid selector 824, of the user device 110, may send the audio data 711 to the wakeword detection component 720. If the wakeword detection component 720 detects a wakeword in the audio data 711, the wakeword detection component 720 may send an indication of such detection to the hybrid selector 824. In response to receiving the indication, the hybrid selector 824 may send the audio data 711 to the system component(s) 120 and/or the ASR component 850. The wakeword detection component 720 may also send an indication, to the hybrid selector 824, representing a wakeword was not detected. In response to receiving such an indication, the hybrid selector 824 may refrain from sending the audio data 711 to the system component(s) 120, and may prevent the ASR component 850 from further processing the audio data 711. In this situation, the audio data 711 can be discarded.

The user device 110 may conduct its own speech processing using on-device language processing components, such as an SLU/language processing component 892 (which may include an ASR component 850 and an NLU component 860), similar to the manner discussed herein with respect to the SLU component 792 (or ASR component 140 and the NLU component 760) of the system component(s) 120. Language processing component 892 may operate similarly to language processing component 792, ASR component 850 may operate similarly to ASR component 140 and NLU component 860 may operate similarly to NLU component 760. The user device 110 may also internally include, or otherwise have access to, other components such as one or more skill components 890 capable of executing commands based on NLU output data or other results determined by the user device 110/system component(s) 120 (which may operate similarly to skill components 690), a user recognition component 895 (configured to process in a similar manner to that discussed herein with respect to the user recognition component 795 of the system component(s) 120), profile storage 870 (configured to store similar profile data to that discussed herein with respect to the profile storage 770 of the system component(s) 120), or other components. In at least some embodiments, the profile storage 870 may only store profile data for a user or group of users specifically associated with the user device 110. Similar to as described above with respect to skill component 690, a skill component 890 may communicate with a skill system component(s) 125. The user device 110 may also have its own language output component 893 which may include NLG component 879 and TTS component 880. Language output component 893 may operate similarly to language output component 793, NLG component 879 may operate similarly to NLG component 779 and TTS component 880 may operate similarly to TTS component 780.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s) 120.

The hybrid selector 824, of the user device 110, may include a hybrid proxy (HP) 826 configured to proxy traffic to/from the system component(s) 120. For example, the HP 826 may be configured to send messages to/from a hybrid execution controller (HEC) 827 of the hybrid selector 824. For example, command/directive data received from the system component(s) 120 can be sent to the HEC 827 using the HP 826. The HP 826 may also be configured to allow the audio data 711 to pass to the system component(s) 120 while also receiving (e.g., intercepting) this audio data 711 and sending the audio data 711 to the HEC 827.

In at least some embodiments, the hybrid selector 824 may further include a local request orchestrator (LRO) 828 configured to notify the ASR component 850 about the availability of new audio data 711 that represents user speech, and to otherwise initiate the operations of local language processing when new audio data 711 becomes available. In general, the hybrid selector 824 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) 120 and chooses to use that remotely-determined directive data.

Thus, when the audio data 711 is received, the HP 826 may allow the audio data 711 to pass through to the system component(s) 120 and the HP 826 may also input the audio data 711 to the on-device ASR component 850 by routing the audio data 711 through the HEC 827 of the hybrid selector 824, whereby the LRO 828 notifies the ASR component 850 of the audio data 711. At this point, the hybrid selector 824 may wait for response data from either or both of the system component(s) 120 or the local language processing components. However, the disclosure is not limited thereto, and in some examples the hybrid selector 824 may send the audio data 711 only to the local ASR component 850 without departing from the disclosure. For example, the user device 110 may process the audio data 711 locally without sending the audio data 711 to the system component(s) 120.

The local ASR component 850 is configured to receive the audio data 711 from the hybrid selector 824, and to recognize speech in the audio data 711, and the local NLU component 860 is configured to determine a user intent from the recognized speech, and to determine how to act on the user intent by generating NLU output data which may include directive data (e.g., instructing a component to perform an action). Such NLU output data may take a form similar to that as determined by the NLU component 760 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 860) may be selected as usable to respond to a natural language user input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language user input, to use directive data received from the system component(s) 120, assuming a remote response is even received (e.g., when the user device 110 is able to access the system component(s) 120 over the network(s) 199), or to determine output audio requesting additional information from the user 105.

The user device 110 and/or the system component(s) 120 may associate a unique identifier with each natural language user input. The user device 110 may include the unique identifier when sending the audio data 711 to the system component(s) 120, and the response data from the system component(s) 120 may include the unique identifier to identify which natural language user input the response data corresponds.

In at least some embodiments, the user device 110 may include, or be configured to use, one or more skill components 890 that may work similarly to the skill component(s) 690 implemented by the system component(s) 120. The skill component(s) 890 may correspond to one or more domains that are used in order to determine how to act on a spoken input in a particular way, such as by outputting a directive that corresponds to the determined intent, and which can be processed to implement the desired operation. The skill component(s) 890 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 890, a skill system component(s) 125, or a combination of a skill component 890 and a corresponding skill system component(s) 125.

Similar to the manner discussed with regard to FIG. 7, the local user device 110 may be configured to recognize multiple different wakewords and/or perform different categories of tasks depending on the wakeword. Such different wakewords may invoke different processing components of local user device 110 (not illustrated in FIG. 8). For example, detection of the wakeword "Alexa" by the wakeword detection component 720 may result in sending audio data to certain language processing components 892/skill components 890 for processing while detection of the wakeword "Computer" by the wakeword detector may result in sending audio data to different language processing components 892/skill components 890 for processing.

Figure 9:
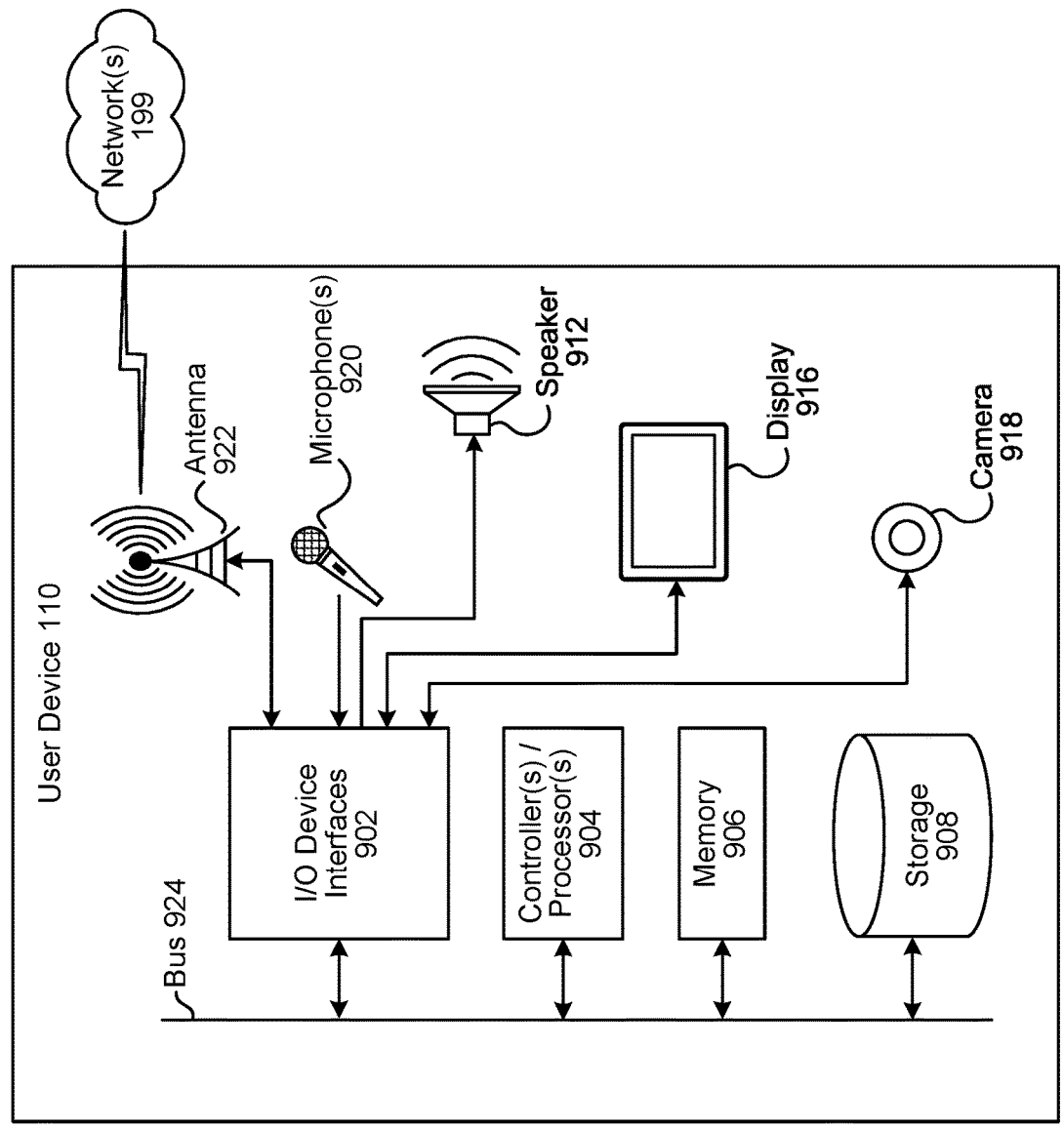
FIG. 9 is a block diagram conceptually illustrating example components of a device, according to embodiments of the present disclosure.
Figure 10:
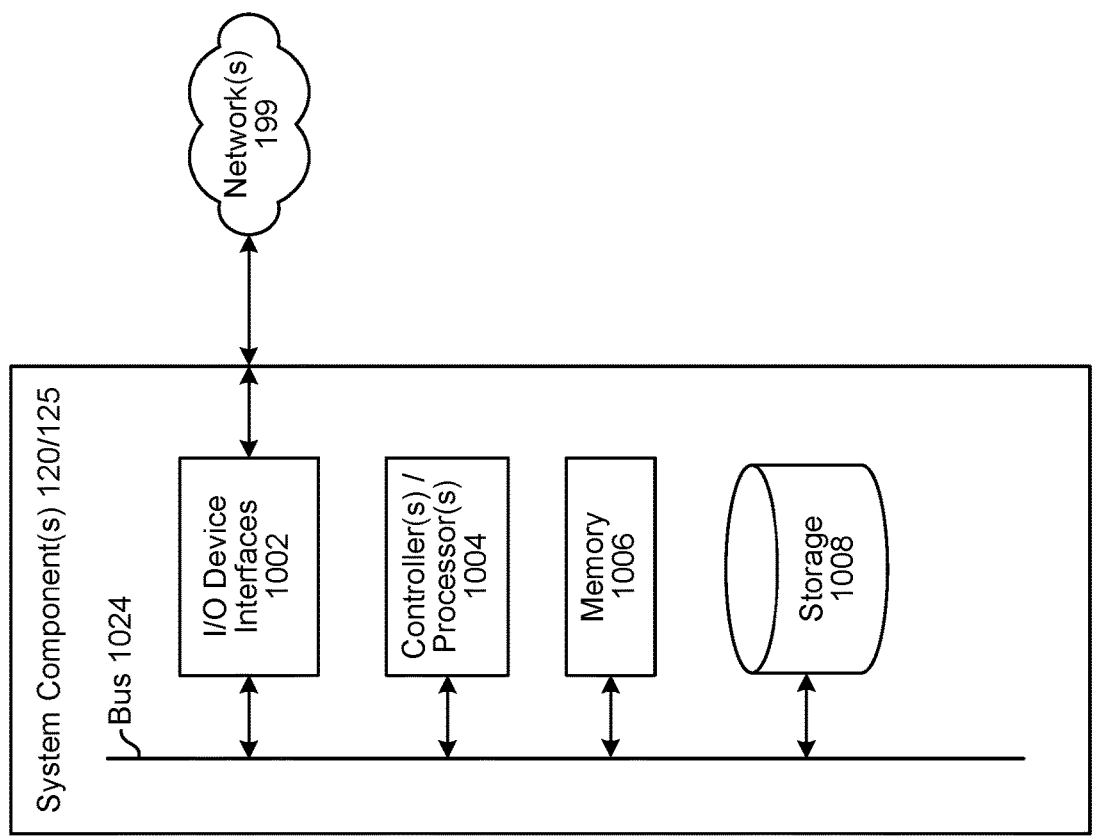
FIG. 10 is a block diagram conceptually illustrating example components of a system, according to embodiments of the present disclosure.

FIG. 9 is a block diagram conceptually illustrating a user device 110 that may be used with the system. FIG. 10 is a block diagram conceptually illustrating example components of a remote device, such as the natural language command processing system component(s) 120, which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) 120 may be located remotely from the user device 110 as its operations may not require proximity to the user. The server/system component(s) 120 may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) 120 being in a user's home/business is that data used to process a command/return a response may be kept within the user's home, thus reducing potential privacy concerns.

Multiple systems (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 922, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the natural language command processing system component(s) 120, or a skill system component(s) 125 may include their own dedicated processors, memory, and/or storage. Alternatively, one or more of the components of the device(s) 110, the natural language command processing system component(s) 120, or a skill system component(s) 125 may utilize the I/O interfaces (902/1002), processor(s) (904/1004), memory (906/1006), and/or storage (908/1008) of the device(s) 110, natural language command processing system component(s) 120, or the skill system component(s) 125, respectively. Thus, the ASR component 140 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s) 120, and a skill system component(s) 125, as described herein, are illustrative, and may be located as a stand-alone device or may be included, in whole or in part, as a component of a larger device or system. As can be appreciated, a number of components may exist either on a system component(s) 120 and/or on user device 110. For example, language processing 792/892 (which may include ASR 140/850), language output 793/893 (which may include NLG 779/879 and TTS 780/880), etc., for example as illustrated in FIGS. 7 and 8. Unless expressly noted otherwise, the system version of such components may operate similarly to the device version of such components and thus the description of one version (e.g., the system version or the local version) applies to the description of the other version (e.g., the local version or system version) and vice-versa.

Figure 11:
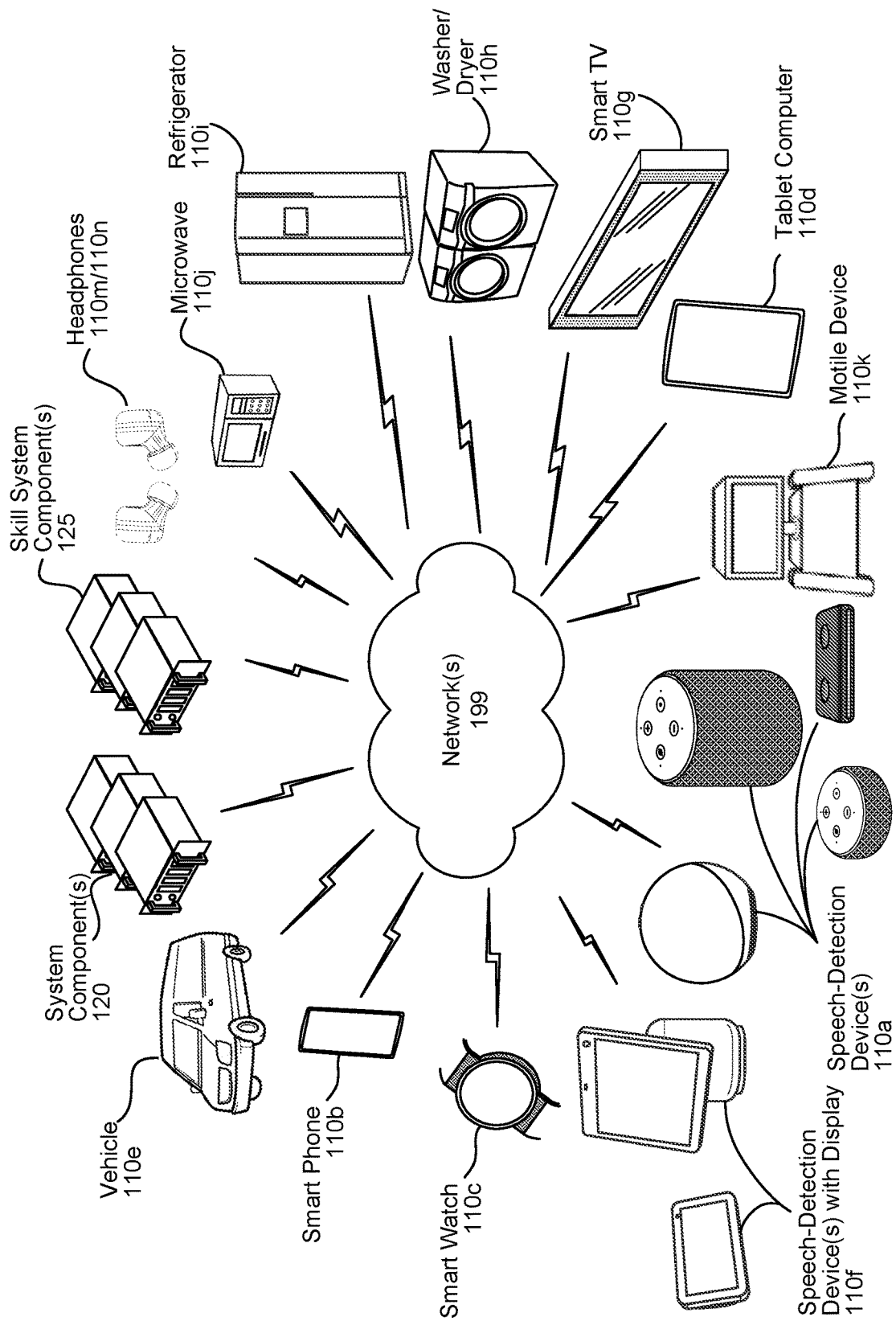
FIG. 11 illustrates an example of a computer network for use with the overall system, according to embodiments of the present disclosure.

As illustrated in FIG. 11, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile user device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 140, the NLU component 760, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first input data representing a first question corresponding to a first dialog in a natural language;
   receiving second input data representing a first response to the first question;
   receiving third input data corresponding to a request to generate a second question following the first response;
   using a first machine learning (ML) component configured to generate data associated with a predicted question of a dialog, processing the first input data, the second input data, and the third input data to determine:
   a first category corresponding to the second question, and
   a first explanation of relevance of the first category;
   processing, using a second ML component, the first input data, the second input data, the third input data, the first category, and the first explanation to generate the second question; and
   outputting the second question.

2. The computer-implemented method of claim 1, further comprising:
   receiving fourth input data representing a third question corresponding to a second dialog in the natural language;
   receiving fifth input data representing a second response to the third question;
   processing, by a first preliminary ML component, the fourth input data and the fifth input data to determine:
   a second category corresponding to a fourth question following the second response, and
   a second explanation of relevance of the second category;
   determining a first comparison of the second category and a training category corresponding to the third question;
   determining a second comparison of the second explanation and a training natural explanation corresponding to the third question; and
   based on the first comparison and the second comparison, determining a third ML component.

3. The computer-implemented method of claim 2, further comprising:
   after determining the third ML component, processing, using the third ML component, the fourth input data, the fifth input data, the second category, and the second explanation to generate the third question;
   determining a third comparison of the third question and a training question; and
   based on the third comparison, determining a fourth ML component, wherein the first ML component and the second ML component correspond to the fourth ML component.

4. The computer-implemented method of claim 1, further comprising:
   prior to receiving the first input data, receiving a transcript of a description of a first event associated with the first dialog;
   using a third ML component, processing the transcript to generate a third question associated with the first event; and
   outputting the third question.

5. A computer-implemented method comprising:
   receiving first input data corresponding to a first natural language question;
   receiving second input data corresponding to first natural language response to the first natural language question;
   using a first machine learning (ML) component configured to generate data associated with a predicted question of a dialog, processing the first input data and the second input data to determine:
   a first category corresponding to a second natural language question following the first natural language response, and
   a first explanation of relevance of the first category;
   using the first input data, the second input data, the first category, and the first explanation, generating the second natural language question; and
   outputting the second natural language question.

6. The computer-implemented method of claim 5, further comprising:
   prior to receiving the first input data, receiving third input data corresponding to a natural language description of a first event;
   using a second ML component, processing the third input data to generate a third natural language question associated with the first event; and
   outputting the third natural language question.

7. The computer-implemented method of claim 5, wherein:
   the first input data and the second input data are associated with a first dialog involving a first user and a second user,
   the first natural language question corresponds to a question asked by the first user to the second user,
   the first natural language response corresponds to a response of the second user to the question asked by the first user, and
   the second natural language question is configured to be addressed to the second user.

8. The computer-implemented method of claim 5, wherein:
   generating the second natural language question comprises processing the first input data, the second input data, the first category, and the first explanation using a second ML component.

9. The computer-implemented method of claim 5, further comprising:
- determining third input data corresponding to a third natural language question previously presented, wherein:
- determining the first category is further based on processing the third input data,
- determining the first explanation is further based on processing the third input data, and
- determining the second natural language question is further based on processing the third input data.

10. The computer-implemented method of claim 5, further comprising:
- after outputting the second natural language question, receiving third input data corresponding to a second natural language response to the second natural language question;
- receiving fourth input data corresponding to the second natural language question;
- using the first ML component, processing the third input data and the fourth input data to determine:
- a second category corresponding to a third natural language question following the second natural language response, and
- a second explanation of relevance of the second category;
- processing the third input data, the fourth input data, the second category, and the second explanation to generate the third natural language question;
- determining that the third natural language question is semantically similar to the second natural language question; and
- ceasing processing with respect to the third natural language question.

11. The computer-implemented method of claim 5, further comprising:
- after outputting the second natural language question, receiving third input data corresponding to a request to output an explanation of relevance of the second natural language question; and
- based on the third input data corresponding to the request to output the explanation of relevance of the second natural language question, outputting the first explanation.

12. The computer-implemented method of claim 5, wherein:
- the first input data and the second input data are associated with a first dialog, the first dialog corresponding to a first goal to be achieved during the first dialog, and
- the method further comprises:
- using the first ML component, processing the first input data, the second input data, the first category, and the first explanation to generate the second natural language question, wherein the second natural language question is configured to result in third input data associated with the first goal.

13. A computing system comprising:
- at least one processor; and
- at least one memory comprising instructions that, when executed by the at least one processor, cause the computing system to:
- receive first input data corresponding to a first natural language question;
- receive second input data corresponding to a first natural language response to the first natural language question;
- using a first machine learning (ML) component configured to generate data associated with a predicted question of a dialog, process the first input data and the second input data to determine:
- a first category corresponding to a second natural language question following the first natural language response, and
- a first explanation of relevance of the first category;
- using the first input data, the second input data, the first category, and the first explanation, generating the second natural language question; and
- outputting the second natural language question.

14. The computing system of claim 13, wherein the at least one memory further comprises instructions that, when executed by the at least one processor, further cause the computing system to:
- prior to receiving the first input data, receive third input data corresponding to a natural language description of a first event;
- using a second ML component, process the third input data to generate a third natural language question associated with the first event; and
- output the third natural language question.

15. The computing system of claim 13, wherein:
- the first input data and the second input data are associated with a first dialog involving a first user and a second user,
- the first natural language question corresponds to a question asked by the first user to the second user,
- the first natural language response corresponds to a response of the second user to the question asked by the first user, and
- the second natural language question is configured to be addressed to the second user.

16. The computing system of claim 13, wherein:
- generating the second natural language question comprises processing the first input data, the second input data, the first category, and the first explanation using a second ML component.

17. The computing system of claim 13, wherein the at least one memory further comprises instructions that, when executed by the at least one processor, further cause the computing system to:
- determine third input data corresponding to a third natural language question previously presented, wherein:
- determining the first category is further based on processing the third input data,
- determining the first explanation is further based on processing the third input data, and
- determining the second natural language question is further based on processing the third input data.

18. The computing system of claim 13, wherein the at least one memory further comprises instructions that, when executed by the at least one processor, further cause the computing system to:
- after outputting the second natural language question, receive third input data corresponding to a second natural language response to the second natural language question;
- receive fourth input data corresponding to the second natural language question;
- using the first ML component, process the third input data and the fourth input data to determine:
- a second category corresponding to a third natural language question following the second natural language response, and
- a second explanation of relevance of the second category;

process the third input data, the fourth input data, the second category, and the second explanation to generate the third natural language question;

determine that the third natural language question is semantically similar to the second natural language question; and cease processing with respect to the third natural language question.

19. The computing system of claim 13, wherein the at least one memory further comprises instructions that, when executed by the at least one processor, further cause the computing system to:

after outputting the second natural language question, receive third input data corresponding to a request to output an explanation of relevance of the second natural language question; and based on the third input data corresponding to the request to output the explanation of relevance of the second natural language question, outputting the first explanation.

20. The computing system of claim 13, wherein:

the first input data and the second input data are associated with a first dialog, the first dialog corresponding to a first goal to be achieved during the first dialog, and the at least one memory further comprises instructions that, when executed by the at least one processor, further cause the computing system to:

using the first ML component, process the first input data, the second input data, the first category, and the first explanation to generate the second natural language question, wherein the second natural language question is configured to result in third input data associated with the first goal.

* * * * *